US011637417B2

(12) United States Patent
Zukerman et al.

(10) Patent No.: US 11,637,417 B2
(45) Date of Patent: Apr. 25, 2023

(54) SYSTEM AND METHOD FOR ANALYZING SURVIVABILITY OF AN INFRASTRUCTURE LINK

(71) Applicant: City University of Hong Kong, Kowloon (HK)

(72) Inventors: Moshe Zukerman, Kowloon (HK); Zengfu Wang, Xi'an (CN); Qing Wang, Kowloon (HK); William Moran, Palwyn (AU); Elias Tahchi, Quarry Bay (HK)

(73) Assignee: City University of Hong Kong, Kowloon (HK)

( * ) Notice: Subject to any disclaimer, the term of this patent is extended or adjusted under 35 U.S.C. 154(b) by 592 days.

(21) Appl. No.: 16/123,471

(22) Filed: Sep. 6, 2018

(65) Prior Publication Data

US 2020/0083679 A1  Mar. 12, 2020

(51) Int. Cl.
  *G06Q 10/06* (2012.01)
  *G06Q 10/04* (2012.01)
  *H02G 1/06* (2006.01)
  *G06F 16/29* (2019.01)
  *G06Q 10/0635* (2023.01)
  *G06Q 10/047* (2023.01)

(52) U.S. Cl.
  CPC .............. *H02G 1/06* (2013.01); *G06F 16/29* (2019.01); *G06Q 10/047* (2013.01); *G06Q 10/0635* (2013.01)

(58) Field of Classification Search
  CPC ....................................................... H02G 1/06
  USPC ....................................................... 370/254
  See application file for complete search history.

(56) References Cited

U.S. PATENT DOCUMENTS

| 8,542,127 | B1* | 9/2013 | Goroshevskiy | G01N 27/82 |
| | | | | 340/657 |
| 8,668,406 | B2* | 3/2014 | Vidal | H02G 1/10 |
| | | | | 405/178 |
| 11,031,757 | B2* | 6/2021 | Bhattacharya | G01C 21/20 |
| 11,435,199 | B2* | 9/2022 | Lermusiaux | G01C 21/3446 |
| 2006/0020431 | A1* | 1/2006 | Gipps | G06Q 10/047 |
| | | | | 703/1 |
| 2007/0033060 | A1* | 2/2007 | Gopalan | G06Q 10/067 |
| | | | | 705/7.12 |
| 2012/0155557 | A1* | 6/2012 | Bush | H04L 45/124 |
| | | | | 375/257 |
| 2014/0278273 | A1* | 9/2014 | Bowler | G06F 30/18 |
| | | | | 703/1 |

(Continued)

OTHER PUBLICATIONS

Z. Wang, Q. Wang, M. Zukerman and B. Moran, "A Seismic Resistant Design Algorithm for Laying and Shielding of Optical Fiber Cables," IEEE/OSA Journal of Lightwave Technology, vol. 35, No. 14, pp. 3060-3074, Jul. 2017.

*Primary Examiner* — Folashade Anderson
(74) *Attorney, Agent, or Firm* — Renner Kenner Greive Bobak Taylor & Weber

(57) ABSTRACT

A method for analyzing survivability of an infrastructure link includes determining an optimal path arrangement of the infrastructure link between two geographic locations; and determining a risk index associated with the determined optimal path arrangement based on one or more quantified cost factors and one or more quantified risk factors associated with the determined optimal path arrangement. The risk index represents a survivability of the infrastructure link.

17 Claims, 28 Drawing Sheets

(56) References Cited

U.S. PATENT DOCUMENTS

| | | | |
|---|---|---|---|
| 2016/0253364 A1* | 9/2016 | Gomadam | G06F 16/256 |
| | | | 707/739 |
| 2019/0025423 A1* | 1/2019 | Sajwaj | G01S 13/867 |
| 2019/0116090 A1* | 4/2019 | Zukerman | G06Q 50/08 |
| 2019/0369290 A1* | 12/2019 | Zukerman | G01V 99/005 |
| 2019/0370711 A1* | 12/2019 | Zukerman | G06F 30/20 |
| 2020/0271088 A1* | 8/2020 | Shen | G05B 17/02 |
| 2021/0012183 A1* | 1/2021 | Elsken | G06N 3/063 |
| 2021/0028591 A1* | 1/2021 | Xu | H01S 3/06754 |
| 2021/0390376 A1* | 12/2021 | Byrne | G06N 3/0454 |

* cited by examiner

SYSTEM AND METHOD FOR ANALYZING SURVIVABILITY OF AN INFRASTRUCTURE LINK

TECHNICAL FIELD

The present invention relates to a system and method for analyzing survivability of an infrastructure link, such as an underground or subsea communication cable.

BACKGROUND

Communication cables such as optical fiber long-haul telecommunication cables are crucial to modern society in transmitting information to supply burgeoning demand in the increasingly interconnected world. On one hand, investments in long-haul cables have a significant impact on the economy; on the other hand, breakage or faults of such cables caused by various hazards such as earthquakes can lead to severe social and economic consequences. It is therefore preferable to incorporate disaster mitigation into the cable route planning and design phase with the aim of avoiding such problems.

Path planning is a procedure of selecting the route for laying the cable. The path of a cable affects its construction cost, and the breakage risk of the cable is strongly related to the location of the cable. Both natural hazards and human activities may damage the cables. In view of the high cost involved, it is desirable to improve the survivability of the cables, as well as the survivability of the vehicles laying the cables.

As mentioned, cable failures can lead to severe social and economic consequences. In addition to cable construction cost, cable owners normally incur insurance cost for potential cable failures that require repairs and hence cause loss of income. Charges by governments according to local laws and policies of the various countries along the cable path also influence cable route and cost.

SUMMARY OF THE INVENTION

In accordance with a first aspect of the invention, there is provided a method for analyzing survivability of an infrastructure link, comprising: determining an optimal path arrangement of the infrastructure link between two geographic locations; and determining a risk index associated with the determined optimal path arrangement based on one or more quantified cost factors and one or more quantified risk factors associated with the determined optimal path arrangement; wherein the risk index represents a survivability of the infrastructure link.

Preferably, the risk index represents an expected number of failures of the infrastructure link over a lifetime of the infrastructure link.

Preferably, the risk index represents an uncertainty associated with future costs associated with the infrastructure link.

Preferably, the method further comprises applying a respective weighting to each of the quantified cost and risk factors to determine the risk index.

Preferably, the method further comprises receiving an input associated with the respective weighting.

Preferably, the method further comprises determining the risk index based on a weighted sum of the quantified cost and risk factors.

Preferably, the method further comprises displaying the displaying the determined optimal path arrangement on a map of the geographic terrain.

Preferably, the method further comprises displaying the risk index associated with the optimized path arrangement.

Preferably, determining the risk index associated with the determined optimal path arrangement includes determining a respective local risk index associated with multiple portions of the determined optimal path arrangement, wherein the respective local risk index of at least two portions are determined based on different cost and risk factors.

Preferably, the method further comprises summing or integrating the local risk indexes to obtain the risk index.

Preferably, the infrastructure link comprises a cable and the optimal path arrangements are optimal laying paths. The cable may be an optical cable, such as a sub-marine cable.

In accordance with a first aspect of the invention, there is provided a system for analyzing survivability of an infrastructure link, comprising: a processor for determining an optimal path arrangement of the infrastructure link between two geographic locations; and determining a risk index associated with the determined optimal path arrangement based on one or more quantified cost factors and one or more quantified risk factors associated with the determined optimal path arrangement; wherein the risk index represents a survivability of the infrastructure link.

Preferably, the risk index represents an expected number of failures of the infrastructure link over a lifetime of the infrastructure link.

Preferably, the risk index represents an uncertainty associated with future costs associated with the infrastructure link.

Preferably, the processor is further arranged to apply a respective weighting to each of the quantified cost and risk factors to determine the risk index.

Preferably, the system also includes an input device operably connected with the processor for receiving an input associated with the respective weighting.

Preferably, the system also includes a display operably connected with the processor for displaying the displaying the determined optimal path arrangement on a map of the geographic terrain.

Preferably, the system also includes a display operably connected with the processor for displaying the risk index associated with the optimized path arrangement.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Example 1

Path Optimization for Infrastructure Links

This example relates to path optimization for an infrastructure link between two locations on the Earth's surface that crosses uneven terrain which hinders the stability of cable laying vehicle (or remotely operated vehicle) as it buries the cable.

In one embodiment, the focus is on path optimization of infrastructure links, in particularly, submarine cables, where the terrain is having uneven slope. Preferably, the problem can be formulated as a multi-objective optimal control problem and the objective is to find the set of Pareto optimal paths for the infrastructure link with two objective functions—to minimize the laying cost associated with the laying of the infrastructure link and to minimize the number of potential failures (hence repairs) along the infrastructure link.

Figure 1:
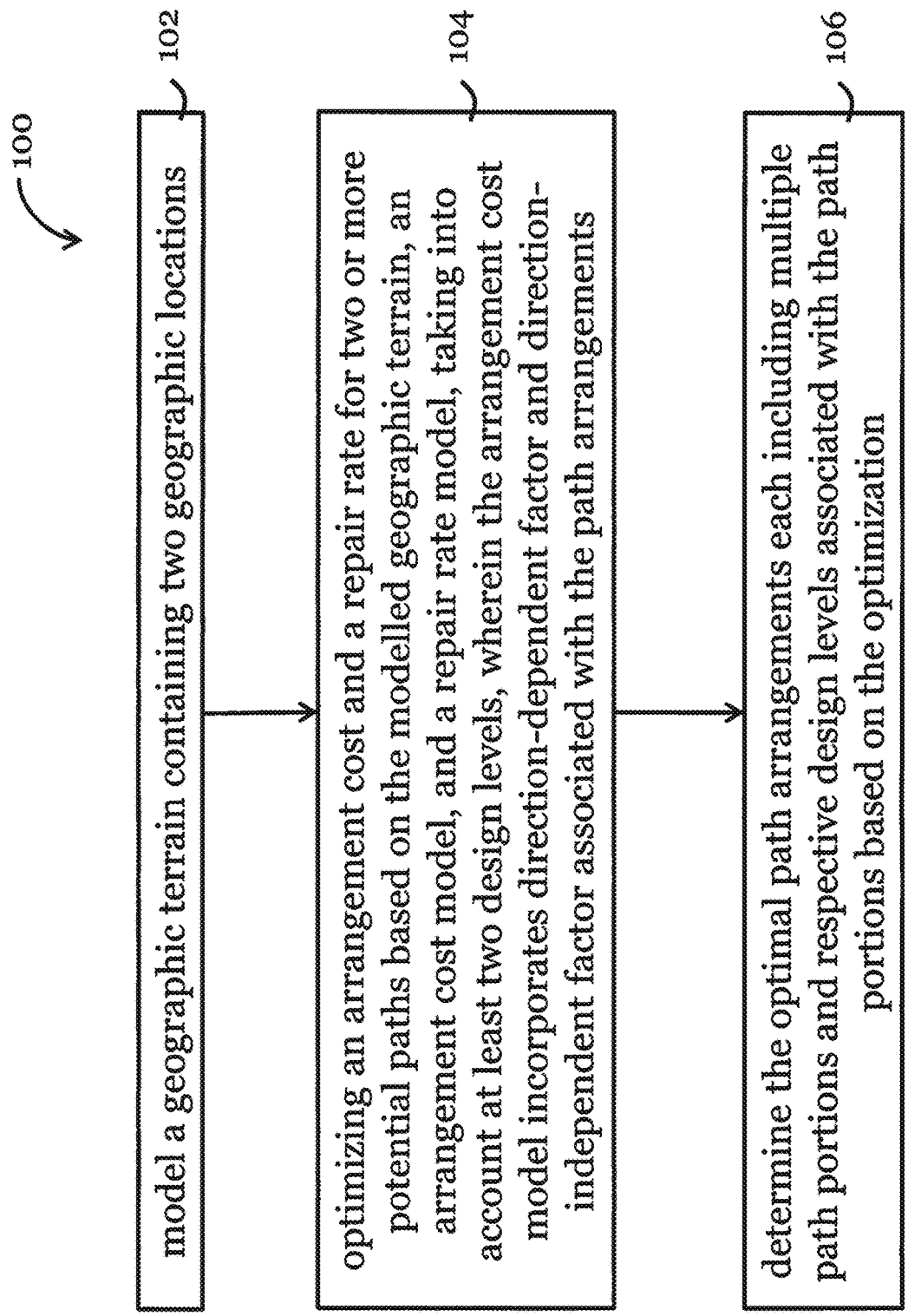
FIG. 1 is a flow diagram illustrating a method for determining optimal path arrangement for an infrastructure link in one embodiment of the invention.

FIG. 1 shows a method 100 for determining optimal path arrangements for an infrastructure link between two geographic locations. The method 100 comprises a step of modelling a geographic terrain containing the two geographic locations 102. The modelling of the geographic terrain in the present embodiment may be built on the state of the art in geographic information systems (GIS) for terrain approximation. GIS based path selection approaches digitize geographic data and represents the surface of the Earth by a graph. Multiple factors affecting cable path planning are considered through a summary cost which is a sum of the weighted costs of each of the factors.

The method 100 further comprises a step 104 to optimize an arrangement cost and a repair rate for two or more potential paths based on the modeled geographic terrain in step 102, an arrangement cost model, and a repair rate model while taking into account of at least two design levels, where the arrangement cost model incorporates direction-dependent factor and direction-independent factor associated with the path arrangements. The direction-dependent factor may comprise direction of the path or slope of the geographic terrain in which the path is arranged, and the direction-independent factor may comprise labor, licenses, or protection level.

In this embodiment, the two objective functions—arrangement cost and repair rate are considered. The first objective function may include the laying cost and the construction cost. For brevity, thereafter, the term arrangement cost used herein refers to mainly to laying cost. The laying cost is applicable to, for example, burying a submarine cable under the seabed. The second objective function is an index associated with the estimation of future number of repairs (or failures) of the link in a given time period (e.g., too years). Although the first objective is about cost incurred during construction, the second objective is about cost incurred in the (potentially, long term) future.

Factors associated with the estimation of the arrangement cost include the length of the link, location (with different terrain slope), requirement for security arrangements, licensing, etc. As an example in this embodiment, the arrangement cost increases enormously when the ROV rolls over in uneven terrain. Whereas the repair rate (failure rate) indicates both potential costs of repairs, as well as link downtime that may have significant societal cost. To calculate the total number of repairs for a link, the term repair rate is used to indicate the predicted number of repairs per unit length of the link over a fixed time period into the future.

While the capital cost of laying a cable is a crucial factor in the overall costs of cable networks, resilience to a range of risks is also important. Both natural hazards and human activities may damage submarine cables. Natural hazards that may damage cables include volcanic activities, tsunamis, landslides and turbidity currents, while human activities in the ocean, such as fishing, anchoring and resource exploration activities also pose a major threat to the safety of submarine cables. It is shown that over 65% of all cable faults occurring in water depths less than 200 m result from human activities.

In order to improve the survivability of submarine cables, various approaches include but not limit to designing the path of the cable to avoid high risk areas, adopting cables with strong protection, and burying the cable under the seabed. As an example, to protect a cable from being damaged by human activities, plough burial operation carried out by a remotely operated vehicle (ROV) is usually performed in water depths of less than 1000 m where seabed conditions allow.

Path planning, a procedure of selecting the route for laying the cable, is an important part of constructing a submarine cable system. The path of a cable affects its construction cost, and the breakage risk of the cable is strongly related to the location of the cable. High slopes increase the propensity of the ROV to topple over as it buries the cable, and so the slope of the terrain needs to be considered during the path planning procedure. It is suggested by the International Cable Protection Committee (ICPC) that the planned path does not violate any of these conditions:

≤6° for side slopes (i.e., the slope in the direction of the path) in buried areas (depending on seabed composition)
≤15° for slopes perpendicular to the route in buried areas
≤25° for slopes perpendicular to the route in surface lay areas The present example, therefore, also takes into consideration of the terrain slope for submarine cables as a multi-objective optimal control problem.

The method 100 further comprises a step 106 to determine the optimal path arrangements each including multiple path portions and respective design levels associated with the path portions based on the optimization. In the present embodiment, the method 100 for determining the optimal path can be approached by converting the multi-objective optimal control problem into a single objective optimal control optimization problem by applying weights to each objective. Pareto optimal path can be obtained by solving the single objective optimal control problem using Ordered Upwind Method (OUM). The method too in the present example also considers non-homogenous cables (i.e. segments of cables at more than one design levels) and the stability of remotely operated vehicle (ROV) in path planning as a function of both the side slope and the slope perpendicular to the path direction.

Modelling

Models are for designing the path and selecting the design level of each point on the path of a cable between the starting node and the destination along the Earth's surface or buried in shallow ground or under seabed. Three models are described below.

In the below models, D denotes a closed and bounded path-connected region on the Earth's surface, and U denotes the set of possible design levels of the cable. The function u: D→U represents the design level: u(x) is the required design level at x∈D based on issues such as earthquake risk, etc. Without loss of generality, the set U of available design levels is assumed to be the same for any point x∈D. Path is designed to select the design level of each point on the path of a cable γ∈D between the Start Point A∈D and the End Point B∈D. Curves in D are assumed parameterized according to the natural parametrization, i.e., parameterizing a curve γ as a function of arc length denoted by s, so that a curve γ: [0; l(γ)]→D is a function from the interval [0; l(γ)], taking values in D, where l(γ) is the length of the curve. This apparently circuitous definition is not to be a problem in practice because of the method used to find such curves. A path (curve) and corresponding design levels are obtained such that γ(0)=A,γl(γ))=B. Below detailed the landform model, laying cost, and the expected number of potential required repairs.

A. Earth's Surface Model

In this embodiment, the Earth's surface is approximated by using a triangulated piecewise-linear two-dimensional manifold M in $R^3$. Each point on M is represented by three-dimensional coordinates (x, y, z), where $z=\xi((x, y)$ is the altitude of geographic location (x, y).

B. Laying Cost Model

As mentioned, the laying cost of submarine cables not only depends on the local site attributes (soil type, elevation, etc.), labor, licenses (e.g. right of way) and protection level, but also depends on the direction of the path. The laying cost consists of two components: (1) a direction-dependent laying cost that depends on the direction of the path and the slope of the terrain in order to account for instability risk of the ROV; (2) a direction-independent laying cost that encompasses all other costs, such as labor, licenses and protection level mentioned above. In this embodiment, let a: R+→A, where A={a∈$T_x$(M)|‖a‖=1} define the direction in which the ROV is facing, where $T_x$(M) is the tangent space of the manifold M at the point x∈M. Note that $\dot{\gamma}(s)=a(s), s\geq 0$ by our definition. The set of admissible controls describe the direction of a path is defined A={a(·): R+→A|a(·) is piecewise continuous}. Redefine u: R+→U by the natural parametrization of a path, where U is the set of the available design levels. The set of admissible design levels for a cable is defined U={u(·): R+→U|u(·) is piecewise constant}.

For any point x=(x, y, z)∈M; z=$\xi$(x, y), we use h(x; a; u) to represent the laying cost per unit length, if the direction of the path is a=($\dot{x}$; $\dot{y}$; $\dot{z}$)∈A and the design level is u∈U. Note that $$\dot{z} = \frac{\partial z}{\partial x}\dot{x} + \frac{\partial z}{\partial y}\dot{y}$$

since x∈M, where $$\frac{\partial z}{\partial x}, \frac{\partial z}{\partial y}$$

is the slope gradient vector at x.

To consider instability risk to the ROV caused terrain slope, the direction-dependent laying cost is modeled as follows. Let $$n = \left(\frac{\partial z}{\partial x}; \frac{\partial z}{\partial y}; -1\right)$$

denote the normal vector at the point x on the surface $z=\xi(x, y)$. The slope in the direction of the path (i.e., side slope) is represented by $$q_1(x, a) = \frac{\|\dot{z}\|}{\sqrt{\dot{x}^2 + \dot{y}^2}} \quad (1)$$

For the path direction a and the normal vector n at the point x, the slope perpendicular to the path is $$q_2(x, a) = \frac{\|(n \times a)_3\|}{\|(n \times a)_{12}\|} = \frac{\left|\frac{\partial z}{\partial x}\dot{y} - \frac{\partial z}{\partial y}\dot{x}\right|}{\sqrt{\left(\frac{\partial z}{\partial y}\dot{z} + \dot{y}\right)^2 + \left(\frac{\partial z}{\partial x}\dot{z} + \dot{x}\right)^2}} \quad (2)$$

where x represents cross product, $(\cdot)_3$ and $(\cdot)_{12}$ represent the third component and the first two components of the resulting vector, respectively.

To incorporate the two considerations of the side slope and the slope perpendicular to the path, an exponential function is used to model the direction-dependent part of the cable laying cost related to terrain slopes which is defined as follows, $$h_1(x,a) = e^{q_1(x,a) - \theta_1} + e^{q_2(x,a) - \theta_2} \quad (3)$$

where $\theta_1 \in R_+$, $\theta_2 \in R_+$ are two thresholds represent the allowable maximum side slope and the slope perpendicular to the path. The use of the exponential function provides a steep penalty for failure to remain within the bounds prescribed for slopes. An alternative may be to have a sharp cut-off penalty but the present approach using (3) appears to work well.

Inclusion of the direction-independent component $h_2(x, u)$ gives the unit-length laying cost function $h(x, a, u)$ as $$h(x,a,u) = h_1(x,a) + h_2(x,u) \quad (4)$$

Observe that this cost function depends both on location of the path and on the direction of the path. The unit-length laying cost function h(x, a, u) is assumed to be continuous and that it satisfies h(x, a, u)>0 for all x∈M, a∈A and u∈U, the non-continuous case of h is discussed later.

As discussed, a cable is to be laid, represented by a Lipschitz continuous curve γ to connect Start Point A and End Point B in M. The total laying cost of the cable γ with the controls of path direction a(·)∈A and design levels u(·)∈U is represented by H(γ, a(·), u(·)). Applying the additive assumption of the laying cost, H(γ, a(·), u(·)) can be written as $$H(\gamma,a(\cdot),u(\cdot)) = \int_0^{l(\gamma)} h(\gamma(s),a(s),u(s))ds \quad (5)$$

where l(γ) is the total length of the cable γ.

C. Cable Repair Model

The term repair rate is used to indicate the predicted number of repairs per unit length of the cable over a fixed time period into the future, which is then extended to include design level variable u. The repair rate at location x=(x, y, z)∈M; z=ξ(x, y) is defined as g(x, u); u∈U. For the same location x on the cable, the repair rate caused by a disaster is lower if a higher-level design is adopted, and vice versa. The repair rate function g(x, u) is also assumed to be continuous and satisfies g(x, u)>0 for all x∈M and u∈U.

Let C(γ, u(·)) denote the total number of repairs of a cable γ with the selection (or control) of design levels u(·)∈U. Again, we assume that G(γ, u(·)) is additive. That is, G(γ, u(·)) can be rewritten as $$G(\gamma,u(\cdot)) = \int_0^{l(\gamma)} g(\gamma(s),u(s))ds \quad (6)$$

As discussed, a higher design level results in a greater direction-independent laying cost and a reduced number of repairs. In other words, $h_2(x, u_1) \leq h_2(x, u_2)$ and $g(x, u_1) \geq g(x, u_2)$ if $u_1 < u_2$, if x∈M.

Ground motion intensities, such as Peak Ground Velocity (PGV) may be used to calculate the repair rate g taking into consideration the risk caused by earthquakes. Other natural hazards (e.g. landslides, debris flows, volcanoes, storms, hurricanes) that may damage cables can be dealt with in the same way using the laying cost model and cable repair model provided that they are local and additive in nature.

Problem Formulation and Solution

The following provides the detailed mathematical formulation of the link path planning problem and then introduced the methodology of this embodiment. Based on the models of landforms, construction cost, and the potential required repairs, the multi-objective optimization problem of minimizing the construction cost and the total number of repairs is as follows:

$$\min_{a(\cdot),u(\cdot)} \Phi(\gamma, a(\cdot), u(\cdot)), \quad \text{(Problem 1)}$$

$$\text{s.t. } \gamma(0) = A, \gamma(l(\gamma)) = B$$

where γ is the cable that connects Start Point A and End Point B.

In general, the two objectives, the laying cost and the total number of repairs are conflicting, so it is impossible to simultaneously minimize both. Therefore, a set of Pareto optimal solutions have to be sought.

A common approach to solve multi-objective optimization problem is to reduce it to a single-objective optimization problem, which operates by minimizing a weighted sum of the objectives to recover Pareto optimal solutions. By the weighted sum approach, Problem 1 is converted into a single-objective path planning problem, namely, $$\min_{a(\cdot),u(\cdot)} \Phi'(\gamma, a(\cdot), u(\cdot)) = \int_0^{l(\gamma)} f(\gamma(s), a(s), u(s))ds, \quad \text{(Problem 2)}$$

$$\text{s.t. } \gamma(0) = A, \gamma(l(\gamma)) = B$$

where $f(\gamma(s), a(s), u(s)) = h(\gamma(s), a(s), u(s)) + c \cdot g(\gamma(s), u(s))$ and $c \in R_+^1 \cup \{0\}$. The assumptions of continuity and non-negativity made for h and g render the weighted cost function $f(\gamma(s), a(s), u(s))$ continuous and non-negative. Since M×A×U is a compact set, there exists $0 < F_{min}, F_{max} < \infty$.

$$F_{min} < f_{min}(x) \leq f(x,a,u) \leq f_{max}(x) < F_{max} \quad (7)$$

For every x, a, u)∈M×A×U, where $$f_{min}(x) = \min_{a \in A, u \in U} f(x, a, u), f_{max}(x) = \max_{a \in A, u \in U} f(x, a, u).$$

The following theorem show that a set of Pareto optimal solutions of Problem 1 can be obtained by solving Problem 2.

Theorem 1

If (γ*; a*(·), u*(·)) is an optimal solution for Problem 2, then it is Pareto optimal for the laying cost H and the total number of repairs G.

For any point x∈M, controls a(·)∈A and u(·)∈U, a cost function is defined φ: M×A×U→R₊ that represents the cumulative weighted cost to travel from the point x to End Point B of a cable β as $$\varphi(\beta, a(\cdot), u(\cdot)) = \int_0^{l(\beta)} f(\beta(s), a(s), u(s)) ds \qquad (8)$$

where β∈Lip([0, +∞); M) is a Lipschitz continuous curve parameterized by its length, $$\|\beta'(s)\| = \left\|\frac{d\beta(s)}{ds}\right\| = 1,$$

β(0)=x, and β(l(β))=B.

Given the definition of the cost function φ, the value function ϕ(x): M→R+ that represents the minimal cumulative weighted cost to travel from the point x to End Point B is $$\phi(x) = \min_{a(\cdot), u(\cdot)} \varphi(\beta, a(\cdot), u(\cdot)) = \varphi(\beta^*, a^*(\cdot), u^*(\cdot)) \qquad (9)$$

where β*∈M, a*(·)∈A and u*(·)∈U are optimal solutions for minimizing φ(β, a(·), u(·)). Evidently, ϕ(B)=0.

Regarded as the function that achieves the lowest cost for x∈M to reach End Point B, the value function ϕ satisfies the following continuous Dynamic Programming Principle (DPP).

Theorem 2

For ever s>0, t≥0, such that 0≤s+t≤l(β*), $$\phi(\beta(s)) = \min_{a(\cdot), u(\cdot)} \left\{ \int_s^{s+t} f(\beta(\tau), a(\tau), u(\tau)) d\tau + \phi(\beta(s+t)) \right\} \qquad (10)$$

That is, controls a*(·) and u(·) are optimal between two points if and only if the same controls are optimal over all intermediate points along the curve.

Next, a partial differential equation, namely the Hamilton-Jacobi-Bellman (HJB) equation can be derived from Equation (10) by applying DPP. Let the controls a*(·), u*(·) and the curve γ be optimal for Problem 2. From Theorem 2, $$\phi(\gamma^*(s)) = \int_s^{s+t} f(\gamma^*(\tau), a^*(\tau), u^*(\tau)) d\tau + \phi(\gamma^*(s+t)) \qquad (11)$$

Dividing Equation (11) by t and rearranging, with t tending to 0, gives $$f(\gamma^*(s), a^*(s), u^*(s)) + \frac{\phi(\gamma^*(s+t)) - \phi(\gamma^*(s))}{t} \approx 0 \qquad (12)$$

Letting t→0, the following static HJB equation is obtained, $$\min_{n \in A; u \in U} \{(\nabla \phi(x) \cdot a) + f(x, a, u)\} = 0, x \in M, \qquad (13)$$

$$\phi(B) = 0$$

where in the above equation denotes the dot product in R₃. Once deriving the value function ϕ, the optimal controls a* and u* can be calculated $$(a^*, u^*) = \mathrm{argmin}_{n \in A; u \in M} \{\nabla \phi(\gamma(s)) \cdot a + f(\gamma(s), a, u)\}, \qquad (14)$$

$$\gamma(0) = A$$

Note that if $f(x, a, u) = f(x)$, the weighted cost function $f$ is isotropic and the cable is homogeneous. The optimal control a* is the direction of steepest descent ϕ, given by $$a^*(x) = -\frac{\nabla \phi(x)}{\|\nabla \phi(x)\|} \qquad (15)$$

As a result, the HJB equation (13) simplifies to the following well known Eikonal equation.

$$\|\nabla \phi(x)\| = f(x), \phi(B) = 0 \qquad (16)$$

In this case, the cable path planning Problem 1 has been described as a multi-objective variational optimization problem and solved by Fast Marching Method (FMM).

If $f(x, a, u) = f(x, u)$; that is, the weighted cost function is isotropic but the cable is nonhomogeneous, the optimal control a* is still the direction of steepest descent of ϕ and the $$\|\nabla \phi(x)\| = \min_u f(x, u), \phi(B) = 0 \qquad (17)$$

In this case, the cable path planning Problem 1 is solved by a FMM-based method.

On the one hand, the classical solution of Equation (13) that is continuous and differentiable (i.e., C) everywhere in the entire domain M may not exist even when the weighted cost function $f$ is smooth. On the other hand, weak solutions of Equation (13), which satisfy Equation (13) except for finitely many points in M are known to be non-unique in most cases. Viscosity solutions, that intuitively are almost classical solutions whenever they are regular enough, are defined as weak solutions for which the maximum principle holds when they are compared with smooth functions. Classical solutions are always viscosity solutions. As a natural solution concept to use for many HJB equations representing physical problems, viscosity solutions always exist and are unique and stable. Accordingly, the viscosity solution of Equation (13) is precisely the value function of Equation (10). Generally, the analytic viscosity solution of the HJB equation (13) is difficult to obtain, so a numerical method has to be sought to compute an approximate solution.

In the present example, Ordered Upwind Method (OUM) is adopted to solve the HJB Equation (13); that is, to obtain an approximation ϕ̄ of ϕ on the vertices of M. Recall that a triangulated piecewise-linear two-dimensional manifold M is used, consisting of faces, edges, and vertices, in $R_3$ to approximate the Earth's surface. It is further assumed that the triangulated manifold model is complete.

Similar to FMM, the solution based on OUM is built outwards from B with $\bar{\phi}(B)=0$. The vertices on M are classified into three categories, "Far, Considered, and Accepted". In the procedure of OUM, the status of vertices can only change from Far to Considered or from Considered to Accepted. In addition, AcceptedFront is defined to be the set of frontier Accepted vertices that neighbor some Considered vertices. For each pair of neighboring vertices $x_j$ and $x_k$ on the AceptedFront, if there is a Considered vertex $x_i$ neighboring both $x_j$ and $x_k$, then the line segment $x_j x_k$ belongs to the set called AF. The nearfront(NF) with respect to each Considered vertex x is defined as $$NF(x) = \{x_j x_k \in AF | \exists \tilde{x} \text{ on } x_j x_k \text{ s.t. } \|\tilde{x} - x\| \leq v\gamma\} \quad (18)$$

where v is the diameter of the triangulated mesh (i.e., if the vertices $x_j$ and $x_k$ are adjacent, then $\|x_j - x_k\| \leq v$), and $$\gamma = \frac{\max f(x, a, u)}{\min f(x, a, u)}.$$

The OUM uses a semi-Lagrangian scheme where the control is assumed to be held constant within each triangle. To update the value function $\bar{\phi}$ of the considered point x, let $x_j, x_k \in NF(x)$ be two adjacent vertices, whose value functions $\bar{\phi}(x_j), \bar{\phi}(x_k)$ are known. Based on the first-order approximation of Equation (10), the upwinding approximation for $\phi(x)$ from a "virtual triangle" $x_j x x_k$ can be defined as:

$$\phi'_{x_j, x_k}(x) = \min_{\zeta \in [0,1]; u \in U} \left\{ \tau(\zeta) f(x, a_\zeta, u) + \zeta \bar{\phi}(x_j) + (1-\zeta) \bar{\phi}(x_k) \right\} \quad (19)$$

where $\tau(\zeta) = \|(\zeta x_j + (1-\zeta) x_k) - x\|$ is the distance vertex x and the interpolation point $\zeta x_j + (1-\zeta) x_k$, and the direction vector $$a_\zeta = \frac{\zeta x_j + (1-\zeta) x_k - x}{\tau \zeta}.$$

Golden Section Search can be used to solve the minimization problem 6 in Equation (19). The value function $\bar{\phi}(x)$ at x is then obtained by $$\bar{\phi}(x) = \min_{x_j x_k \in NF(x)} \phi'_{x_j, x_k}(x) \quad (20)$$

Note that $\phi x_j, x_k(x)$ is defined even when $x_j$ and $x_k$ are not adjacent to x. The OUM-based algorithm for Problem 2 is summarized as Algorithm 1. As discussed above, by setting different values of c in Problem 2, different Pareto optimal solutions of the laying cost and the total number of repairs can be obtained. An approximate Pareto front can be generated from the set of obtained Pareto optimal solutions.

Algorithm 1—Algorithm for path planning in the region of interest D.

Input: Region D (modeled as M ), laying cost model h and repair rate model g on D, mesh size $\Delta x, \Delta y$, Start Point A, End Point B, c, step size $\gamma$;

Algorithm 1—Algorithm for path planning in the region of interest D.

Output: Path $\gamma$ with minimum weighted cost;
1: Discretize D rectangularly with $\Delta x$ in x and $\Delta y$ in y, and denote the set of points on the grid by $\Gamma$;
2: Create edges, faces and obtain a complete triangulation (i.e., M) of D based on $\Gamma$;
3: Initialize the labels of all the vertices in $\Gamma$ except Start Point A as Far. Label Start Point A as Accepted;
4: Label all the vertices $x \in \Gamma$ adjacent to Start Point A as Considered and update their values by Equation (20); Let $\bar{x} = \arg\min x \in \Gamma$, x is Considered $\bar{\phi}(x)$.
5: Label $\bar{x}$ as Accepted and update the AcceptedFront.
6: Label the Far vertices neighbouring to $\bar{x}$ as Considered and update their values by Equation (20).
7: For each other Considered x such that $\bar{x} \in NF(x)$, update its value by $$\bar{\phi}(x) \triangleq \min\left\{\bar{\phi}(x), \min_{\bar{x} x_i \in NF(x)} \bar{\phi}_{\bar{x}, x_i}(x)\right\}. \quad (21)$$

8: If there is Considered vertex, then go to Step 5.
9: Let $\gamma(0) = B$ and $k = 0$.
10: while $\|\gamma(k) - A\|^2 > \varepsilon$ do
11: Compute the gradient $\nabla \bar{\phi}(\gamma(k))$ using finite-difference from the obtained value function $\bar{\phi}$;
12: Compute the optimal controls a* and u* by solving Equation (14)
13: compute $\gamma(k+1) = \gamma(k) - \tau \nabla \bar{\phi}(\gamma(k))$, where $\gamma(k)$ is an approximation of $\gamma(t)$ at time $t = k\tau$.
14: end while
15: return $\gamma$.

Algorithm 1

The solution $\bar{\phi}$, produced by the above OUM-based algorithm, is proved to converge to the viscosity solution $\phi$ of the HJB equation (13) as the grid step size tends to zero given the assumption of continuity of the laying cost function h and the cable repair rate function g. Note that when the laying cost function h and the cable repair rate function g are not continuous (for example, the design level u is a discrete variable), no proof of convergence currently exists. Nonetheless, OUM still appears to work correctly in examples and apparently also in the result.

To obtain an approximate optimal path, a minimization problem (14) is solved for a* and u* (replacing $\phi$ with $\bar{\phi}$ computed by the OUM) each time the path exits its current triangle and enters a new adjacent triangle. The path is not restricted to the edges of the mesh and is found from $\gamma(0)=A$, and is completed when End Point B is reached. The computational complexity of OUM is $$O\left(\frac{Fmax}{Fmin} N \log N\right),$$

where N is the number of vertices in the mesh M.

Applications

This section illustrates the applications of Algorithm 1 to two 3D realistic scenarios. To explicitly show how the instability risk affects the path of a cable, in the first scenario, only the minimization of laying cost is considered when designing the path of the cable between two nodes. It is assumed that there is only one design level in the first scenario. Additionally, the resulted path of the OUM-based algorithm is compared with that of the FMM-based algorithm.

In the second scenario, both the laying cost and the total number of repairs are minimized taking into account instability risk. Without loss of generality, it is assumed that there are two design levels in this scenario: Level 1 (low level)—without any protection and Level 2 (high level)—with protection by cable shielding. In the second scenario, considering the tradeoff between the laying cost and the total number of repairs, the Pareto optimal solutions are obtained and the corresponding approximate Pareto front is generated.

A. The First Scenario

Figure 2:
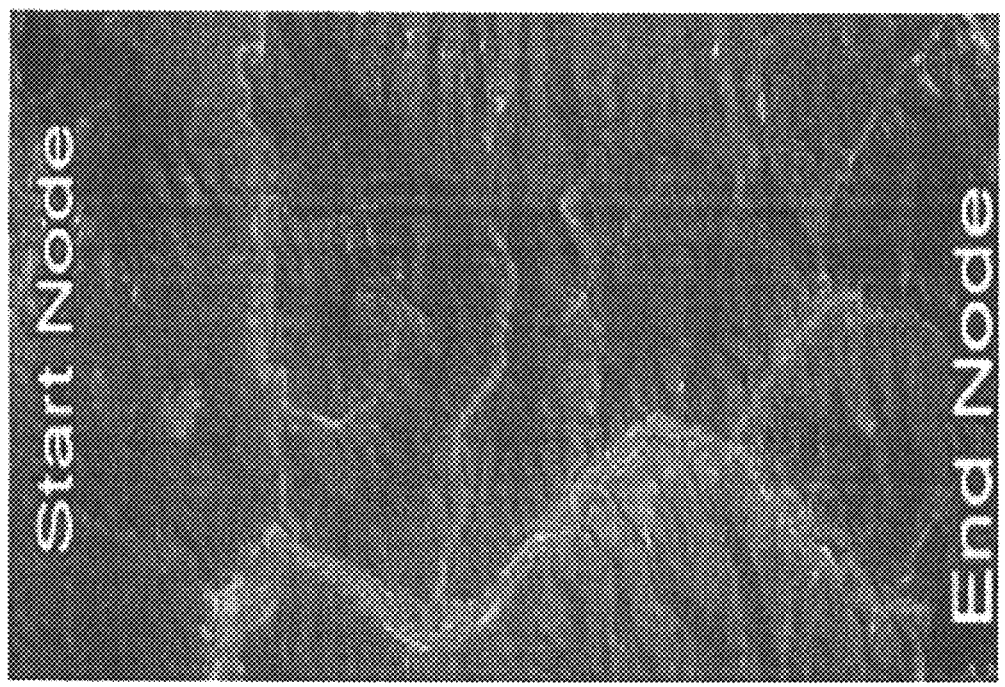
FIG. 2 is a map showing an exemplary region D1, wherein the line illustrates a stream watershed.

FIG. 2 shows a map of an exemplary region D1, which is located in central Taiwan from northwest (23:900° N, 120.850° E) to southeast (23:500° N, 121.000° E). The line illustrates the Chenyoulan Stream Watershed. A cable is laid to connect Start Point (23:897° N, 120.975° E) with End Point (23:501° N, 120.851° E) as shown in FIG. 2.

Figures 3A, 3B:
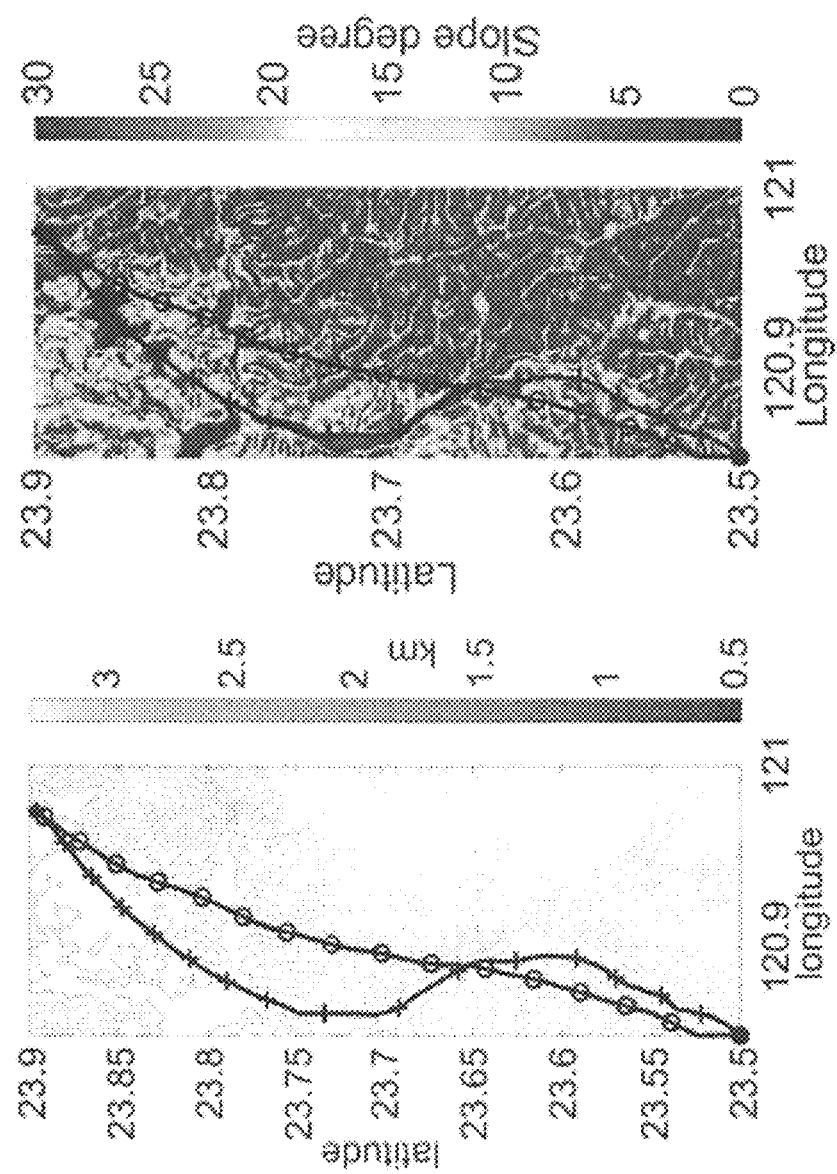
FIG. 3A is a contour map of region D1, wherein the curve marked by pluses indicates the path obtained by the OUM-based algorithm, and the curve marked by circles indicates the path obtained by the FMM-based method.
FIG. 3B is a slope map of region D1, wherein the curve marked by pluses indicates the path obtained by the OUM-based algorithm, and the curve marked by circles indicates the path obtained by the FMM-based method.

FIGS. 3A and 3B are a contour map and a slope map of region D1 respectively, and are calculated using elevation data of the region D1 from FIG. 1. The elevation data of the region D1 were downloaded from the NASA Shuttle Radar Topographic Mission (SRTM). The resolution of the elevation data is 3 arc-second (approximate 90 m) in both longitude and latitude.

In this scenario, the thresholds for the side slope and the slope perpendicular to the path are set to be 6° and 15°, respectively. As mentioned above, only the laying cost of the path is minimized and there is only one design level in this scenario.

Alternatively, $$g(x,u)=0,\ h(x,a,u)=e^{q_1(x,a)-\theta_1}+e^{q_2(x,a)-\theta_2}+h_2(x,u)$$

where $\theta_1=\tan 6°$ and $\theta_2=\tan 15°$. Without loss of generality, we set $h_2(x, u)=1$.

In FIG. 3A, the curve marked by pluses indicates the path obtained by the OUM-based algorithm, and the curve marked by circles indicates the path obtained by the FMM-based method. The laying costs corresponding to the two paths are 142.569 and 150.479 while their lengths are 49.992 km and 47.752 km, respectively. Notice that although the path obtained by OUM-based algorithm is longer, it traverses the watershed to avoid the areas with high slope as much as possible, and therefore it incurs lower laying cost than the path obtained by the FMM-based method.

B. The Second Scenario

Figure 4:
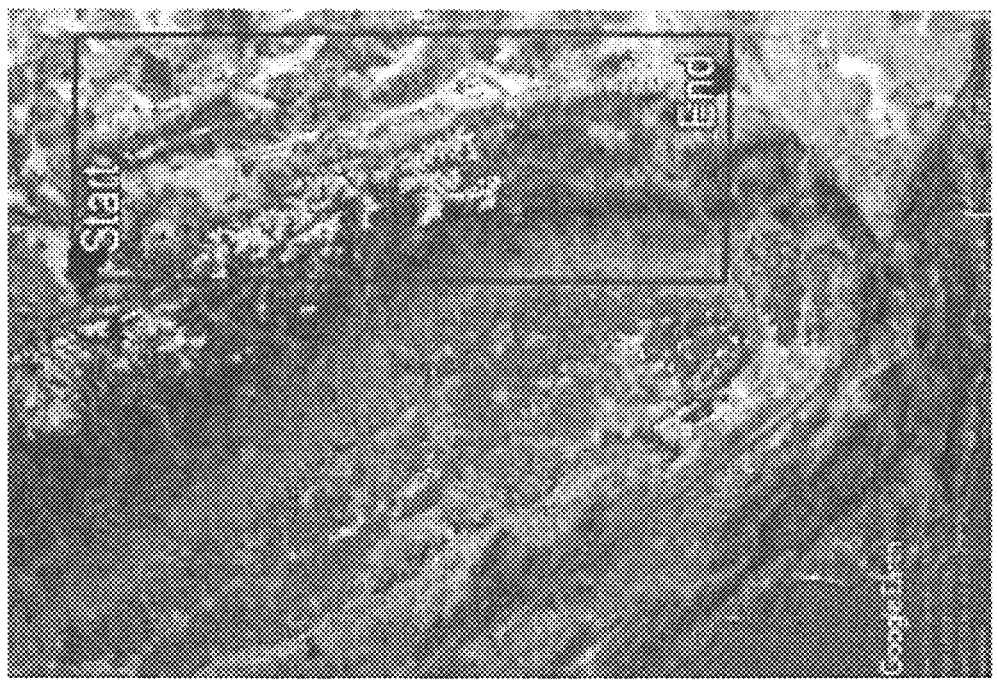
FIG. 4 a map showing an exemplary region D2, wherein the blue rectangular indicate the region D2 and the line illustrates a fault line.

FIG. 4 shows a map of an exemplary region D2 as indicated by the blue rectangular, which is located in State of California and Nevada, from northwest (38:000° N, −119:000° E) to southeast (35:500° N, −117:700° E). The line illustrates the San Andreas fault line. A cable is laid from Start Point (37:900° N, −118:900° E) to End Point (35:600° N, −117:950° E) as shown in FIG. 4. In this scenario, $\theta_1$ is set to be 6° and $\theta_2$ is set to be 11°.

Figures 5A, 5B:
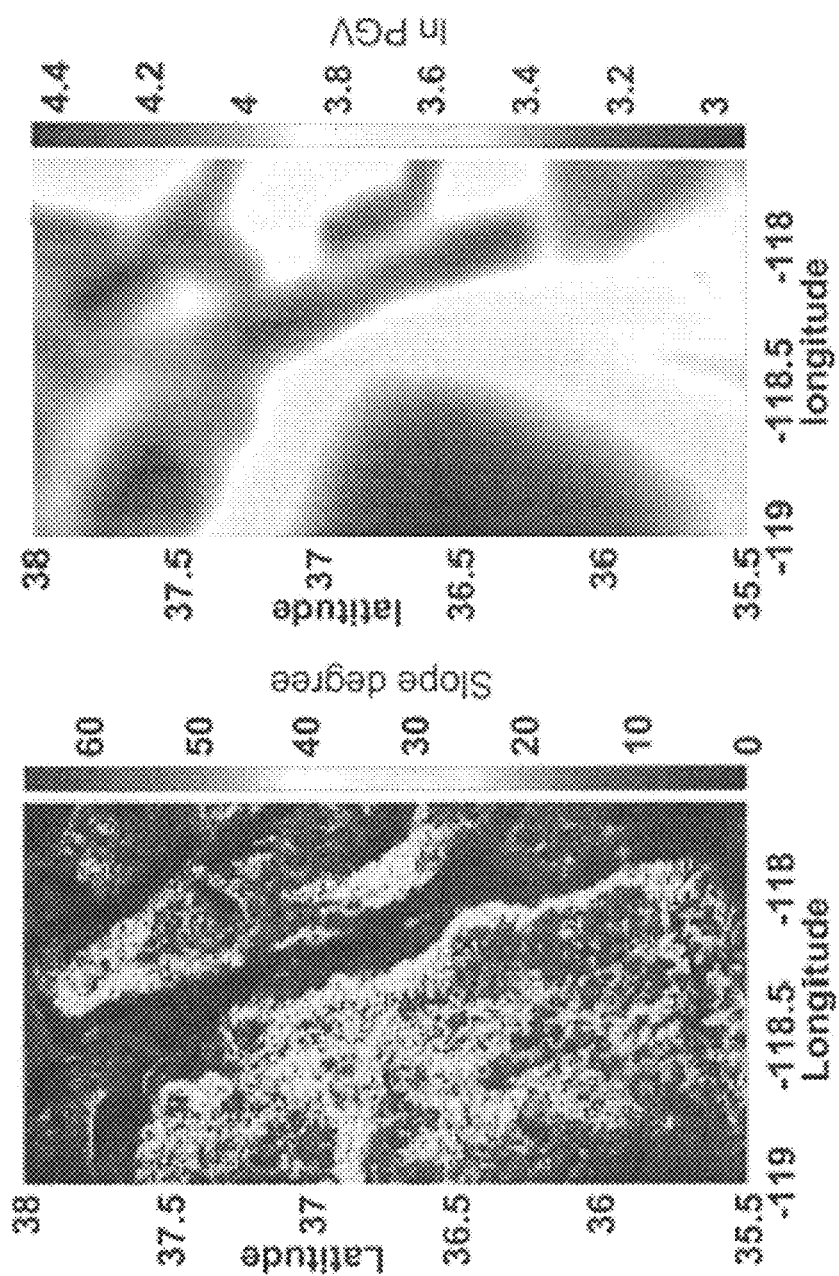
FIG. 5A is a slope map of region D2.
FIG. 5B is a shaded surface map of Peak Ground Velocity (PGV) for region D2 in log scale.

FIG. 5A shows a slope map of region D2, and FIG. 5b shows a shaded surface map of Peak Ground Velocity (PGV) for region D2 in log scale. Again, the elevation data (with 3 arc-second resolution) of the region D2 were downloaded from SRTM. To evaluate the earthquake induced breakage risk of the cable, Peak Ground Acceleration (PGA) data of the region D2 were downloaded from United States Geological Survey (USGS). The spatial resolution of the PGA data is 180 arc-second. The elevation data was downsampled and the PGA data interpolated to generate the same spatial resolution: 30 arc-second elevation data and PGA data. For calculating the total number of repairs of the cable, PGA can be converted to PGV as follows, $$\log_{10}(v)=1.0548\cdot\log_{10}(PGA)-1.5566 \qquad (22)$$

where v (cm/s) represents the PGV value.

FIGS. 6A, 6B, 6C, 6D, 6E and 6F are Pareto optimal paths modelled on the PGV map of region D2 obtained by the OUM-based algorithm, where $H(\gamma^*, a(\cdot), u^*(\cdot))$ and $G(\gamma^*, u^*(\cdot))$ denote the laying cost and total number of repairs, respectively. In each of the FIGS. 6A-6F, the logarithmic PGV map is shown on the left and the slope map is shown on the right, where magenta lines indicate the cable or cable segments adopting Level 1 and the black lines indicate the cable or cable segments adopting Level 2.

The corresponding data collected from each of the Pareto optimal paths in FIGS. 6A-6F, including the laying cost $H(\gamma^*, a(\cdot), u^*(\cdot))$ and total number of repairs $G(\gamma^*, u^*(\cdot))$ are shown in Table 1.

TABLE I

|   | c   | $H(\gamma^*, a(\cdot), u^*(\cdot))$ | $G(\gamma^*, u^*(\cdot))$ |
|---|-----|-------------------------------------|---------------------------|
| a | 0   | 772.4504                            | 46.6757                   |
| b | 3.2 | 806.3512                            | 31.3214                   |
| c | 11  | 900.1517                            | 20.9815                   |
| d | 22  | 1082.1358                           | 9.3630                    |
| e | 45  | 1146.4565                           | 6.1245                    |
| f | 570 | 1200.7766                           | 5.0165                    |

Table I shows the trade-off between the laying cost and the total number of repairs. In order to obtain the approximate Pareto front of the two objectives, the weighting value c may be varied from 0 to 900. As the weight value c increases, the laying cost also increases and total number of repairs decreases.

Figure 6A:
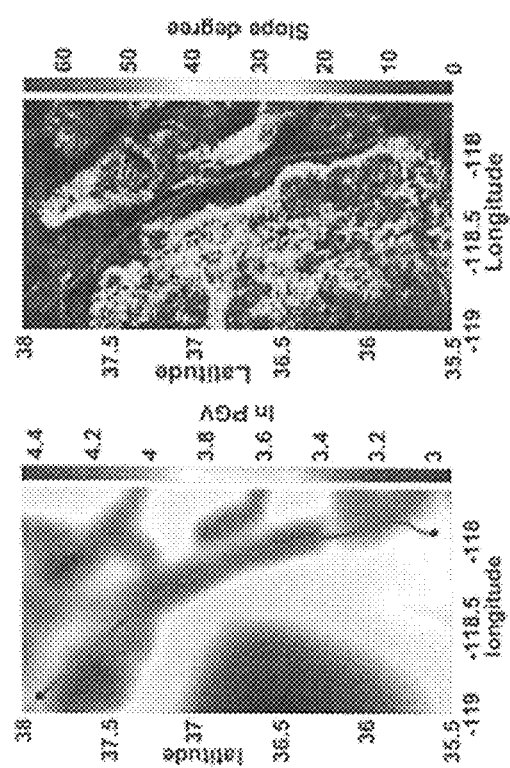
FIGS. 6A, 6B, 6C, 6D, 6E and 6F are Pareto optimal paths modelled on the PGV map of region D2, where the magenta lines indicate the cable or cable segments being adopted at a first design level, and the black lines indicate the cable or cable segments being adopted at a second design level.
Figure 6B:
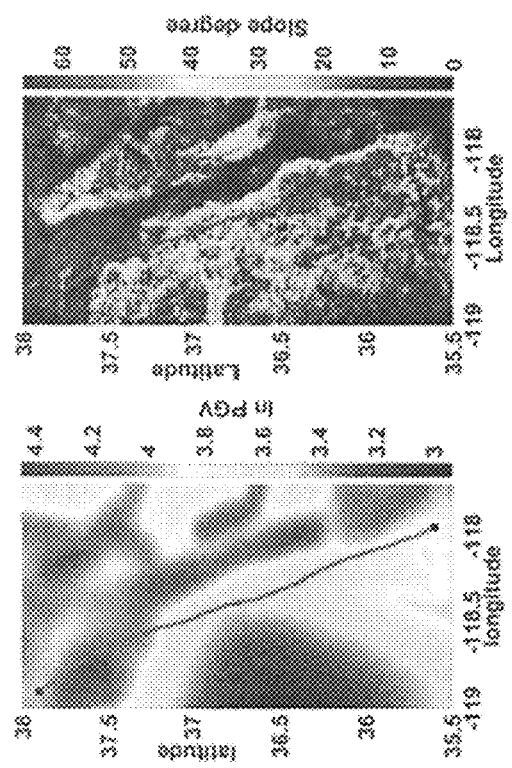
Figure 6C:
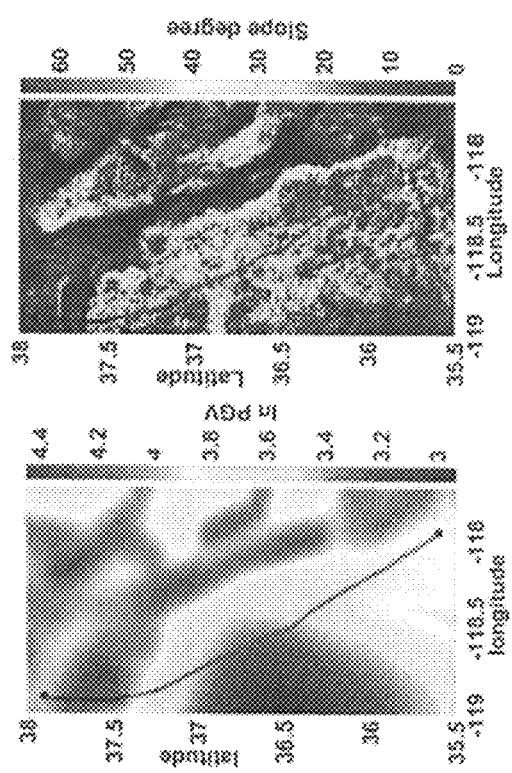
Figure 6D:
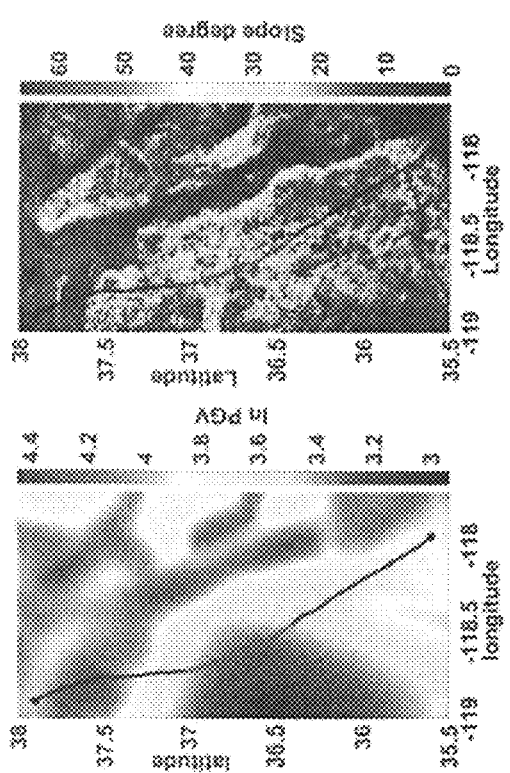
Figure 6E:
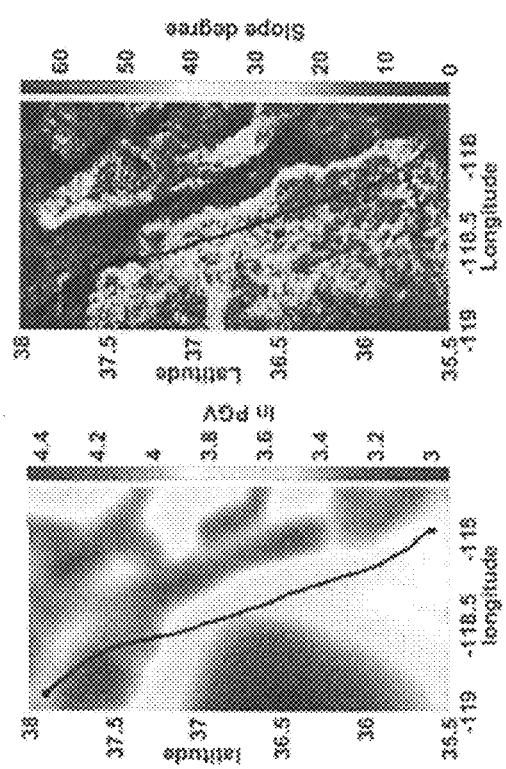
Figure 6F:
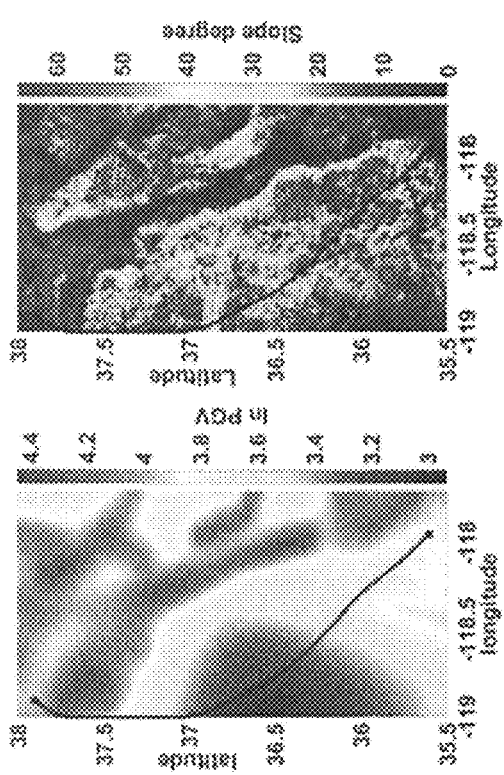

From FIGS. 6A-6F, it is evident that the greater the laying cost, the less the total number of repairs. There are two means to reduce the total number of repairs, either by adding segments with protection (see the black lines in FIG. 6C), or by increasing the length of the cable to avoid the high risk areas shown by FIG. 6B. In FIG. 6A, the weight value c=0, so that only the laying cost is considered, and the cable tends to avoid the high slope areas but passes through the high PGV areas. With increasing weight value c, as shown by FIGS. 6B and 6C, the path of the cable is designed to keep away from the high PGV areas or add segments deployed in the high PGV areas with protection to reduce the total number of repairs.

Figure 7:
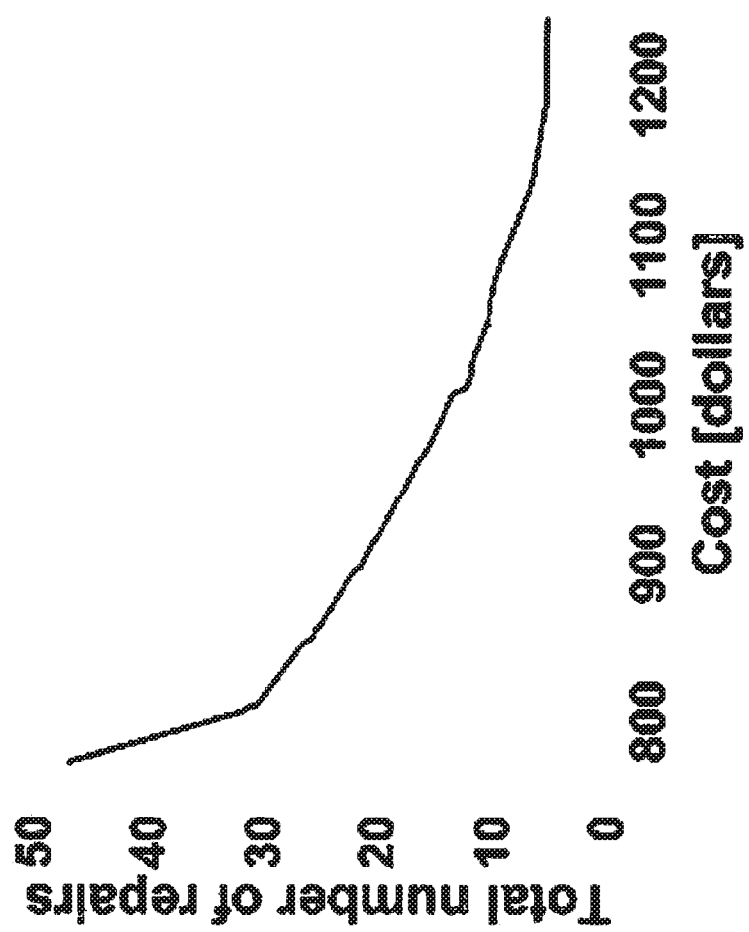
FIG. 7 is a graph showing non-dominated front for two objectives—total number of repairs and cable laying cost.

FIG. 7 is a graph showing non-dominated front for two objectives—total number of repairs and cable laying cost, obtained from FIGS. 6A-6F and Table I. It is shown that avoiding the high PGV regions and adopting a higher design level in high PGV regions are effective in reducing the total number of repairs.

Advantage

The method in the embodiment has provided a solution to address the problem of path and shielding level optimization for a cable connecting two points on Earth's surface while taking into account of high risk areas (including earthquake prone areas) as well as risk of ROV instability.

Advantageously, the ROV stability risk has been incorporated in the laying cost to discourage the path from traversing areas with high slopes. By including the instability risk of ROV depending on the direction of the path and the slope of the terrain, the present example is effective in minimizing the arrangement cost in laying an infrastructure link, for example, by reducing the likelihood of capsize of a ROV as it buries the cable in an uneven terrain.

Using laying cost and total number of repairs of the cable as the two objectives, the problem is formulated as a multi-objective optimal control problem, and subsequently converted into a single objective optimal control problem by the weighted sum method. By applying DPP, a variant of the HJB equation was derived for the single objective optimal control problem. Ordered Upwind Method (OUM) is used to solve the HJB equation, and thereby produces high quality cable path solutions. The present example obtained approximate Pareto fronts for the two objectives, the laying cost and the total number of repairs, and provides insight and guidance to design tradeoffs between cost effectiveness and seismic resilience.

Exemplary System

Figure 8:
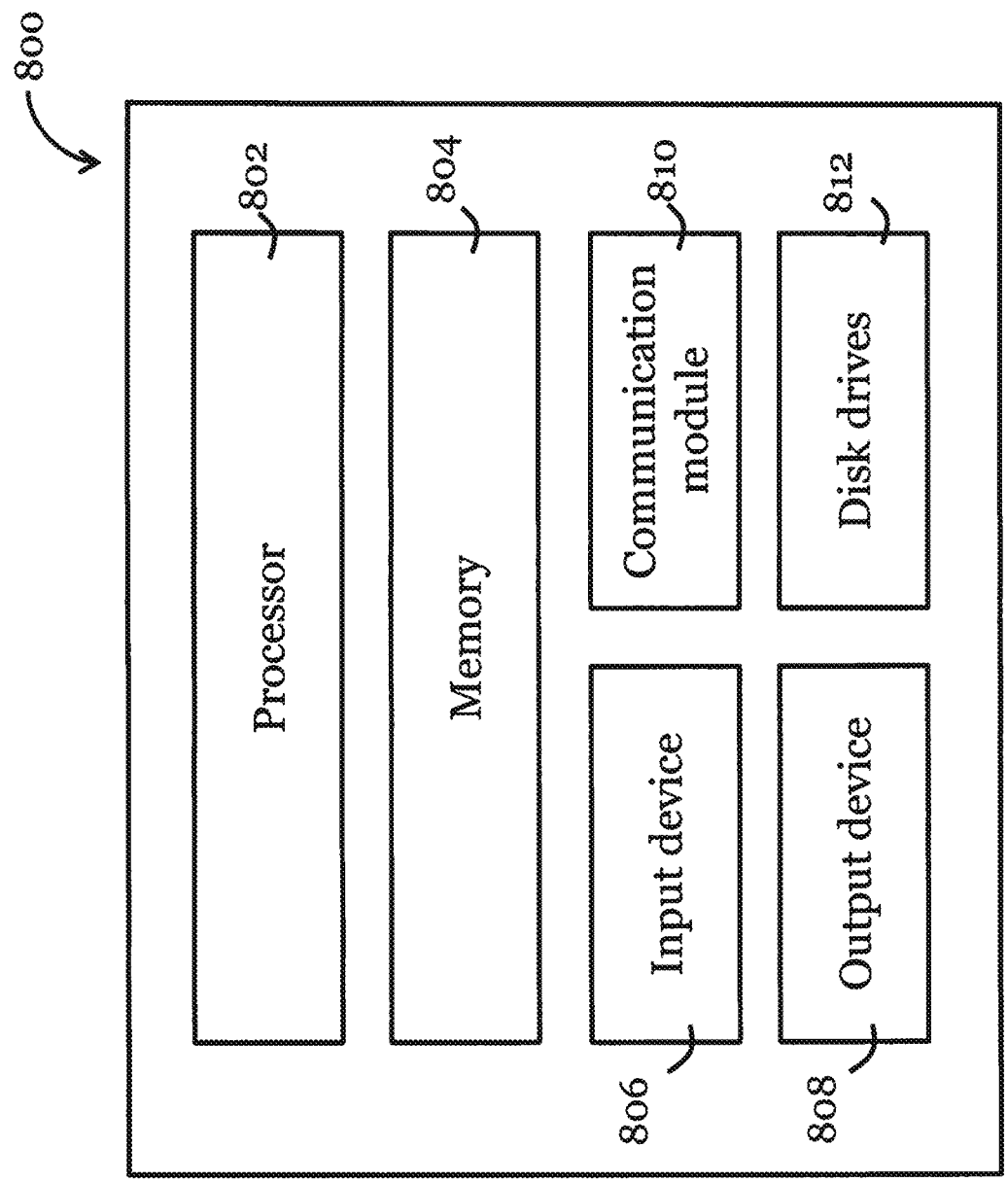
FIG. 8 is an information handling system that can be configured to operate the method of FIG. 1.

Referring to FIG. 8, there is shown a schematic diagram of an exemplary information handling system 800 that can be used as a server or other information processing systems in one embodiment for performing the method in the embodiments in this example. Preferably, the server 800 may have different configurations, and it generally comprises suitable components necessary to receive, store and execute appropriate computer instructions or codes. The main components of the server 800 are a processing unit 802 and a memory unit 804. The processing unit 802 is a processor such as a CPU, an MCU, etc. The memory unit 804 may include a volatile memory unit (such as RAM), a non-volatile unit (such as ROM, EPROM, EEPROM and flash memory) or both. Preferably, the server 80o further includes one or more input devices 806 such as a keyboard, a mouse, a stylus, a microphone, a tactile input device (e.g., touch sensitive screen) and a video input device (e.g., camera). The server 800 may further include one or more output devices 808 such as one or more displays, speakers, disk drives, and printers. The displays may be a liquid crystal display, a light emitting display or any other suitable display that may or may not be touch sensitive. The server 800 may further include one or more disk drives 812 which may encompass solid state drives, hard disk drives, optical drives and/or magnetic tape drives. A suitable operating system may be installed in the server 800, e.g., on the disk drive 812 or in the memory unit 804 of the server 800. The memory unit 804 and the disk drive 812 may be operated by the processing unit 802. The server 800 also preferably includes a communication module 810 for establishing one or more communication links (not shown) with one or more other computing devices such as a server, personal computers, terminals, wireless or handheld computing devices. The communication module 810 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 802, the memory unit 804, and optionally the input devices 806, the output devices 808, the communication module 810 and the disk drives 812 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 800 shown in FIG. 8 is merely exemplary and that different servers 800 may have different configurations and still be applicable in this example.

Although not required, the embodiments described with reference to FIGS. 1-8 can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present example are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the present example as shown in the specific embodiments without departing from the spirit or scope of the present example as broadly described. For example, the method can be applied to determine optimal laying arrangement of any infrastructure link, including fluid pipeline (e.g., oil, water, and gas pipes), electric power cables, electric data cables, optical cables, etc. The present embodiments are to be considered in all respects as illustrative, not restrictive.

Example 2

Path Optimization for Infrastructure Links

This example relates to path optimization for an infrastructure link between two locations on the Earth's surface that crosses a hazardous area associated with natural causes or human activities that may lead to cable failures. Without loss of generality, for ease of exposition, we assume here that earthquakes are the main cause of cable failures, and we adopt the number of potential repairs along a cable as the measure of risk. This measure, widely accepted in practice as well as in the civil engineering literature, has two key advantages: firstly, it has a strong relationship with repair or reconstruction cost and is associated with societal cost incurred by cable failures and, secondly, it can be quantified in terms of cable repair rate and formulae for cable repair rate based on available ground motion intensity data.

In one embodiment, the focus is on path optimization of infrastructure links, such as undersea cables and long-haul oil/gas/water pipelines, where surface distance is a reasonable measure of the length of a link. Preferably, the problem can be formulated as a multi-objective variational problem and the objective is to find the set of Pareto optimal paths for the infrastructure link with two objective functions.

The first objective is to minimize the arrangement cost associated with the laying of the infrastructure link. Connecting the two locations through the route with the shortest surface distance, may minimize the arrangement cost but can increase the risk of damage or break in the event of an earthquake if the route is close to the hazard.

The second objective is to minimize the number of potential failures (hence repairs) along the infrastructure link in the wake of earthquakes, which may serve as an index of the cost associated with the loss and reconstruction of the link in the event of failures.

Figure 9:
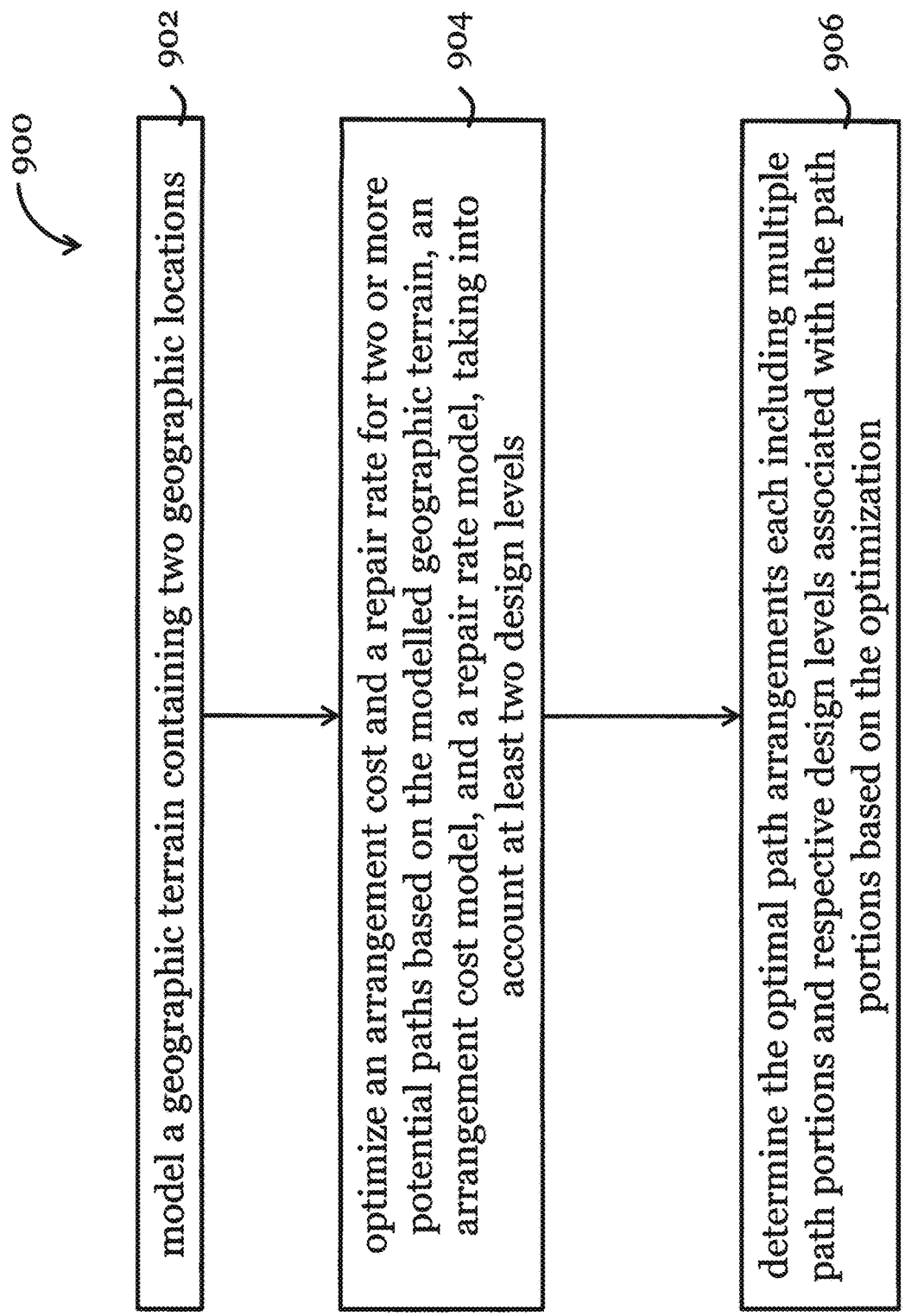
FIG. 9 a flow diagram illustrating a method for determining optimal path arrangement for an infrastructure link in one embodiment of the invention.

FIG. 9 shows a method 900 for determining optimal path arrangements for an infrastructure link between two geographic locations. The method 900 comprises a step of modelling a geographic terrain containing the two geographic locations 902. The modelling of the geographic terrain in the present embodiment may be built on the state of the art in geographic information systems (GIS) for terrain approximation. GIS based path selection approaches digitize geographic data and represents the surface of the Earth by a graph. Multiple factors affecting cable path planning are considered through a summary cost which is a sum of the weighted costs of each of the factors.

The method goo further comprises a step of optimizing an arrangement cost and a repair rate for two or more potential paths based on the modelled geographic terrain in step 902, an arrangement cost model, and a repair rate model while taking into account of at least two design levels 904.

In this embodiment, the two objective functions—arrangement cost and repair rate are considered. The first objective function may include the laying cost and the construction cost. For brevity, thereafter, the term arrangement cost used herein refers to both laying cost and construction cost. The laying cost is applicable to, for example, a telecommunication cable, while the construction cost is application to for example an oil pipeline. The second objective function is an index associated with the estimation of future number of repairs (or failures) of the link in a given time period (e.g., too years). Although the first objective is about cost incurred during construction, the second objective is about cost incurred in the (potentially, long term) future.

Factors associated with the estimation of the arrangement cost include the length of the link, location (with different ground/soil condition), requirement for security arrangements, licensing, etc. Whereas the repair rate (failure rate) indicates both potential costs of repairs, as well as link downtime that may have significant societal cost. As an illustration, after the Taiwan Earthquake in 2006, 18 cuts were found on eight submarine telecommunication cables, affecting Internet service of several Asian countries or regions for several weeks. The financial losses associated with Internet shutdown is enormous, as an estimation, a loss of 1.2% of annual GDP will incur per one week of Internet shutdown in a modern country such as Switzerland.

To calculate the total number of repairs for a link, the term repair rate is used to indicate the predicted number of repairs per unit length of the link over a fixed time period into the future. The present example also takes into consideration of the design levels. For a specific link, the repair rate varies for different points on the link and depends on various factors as well, such as the geology, link material, and ground/soil conditions. In another context considering earthquakes effects, the repair rate has been widely used to assess reliability of water supply networks, and to analyse the risk to gas distribution.

To estimate the repair rate that is used for estimating the total number of repairs of a link, data of ground motion in the past during a certain period of time, or simulations based on given geological knowledge, is used. The method 900 also takes advantage of the extensive work of the United States Geological Survey (USGS) analysts who develop models for the potential effects of future earthquakes.

The total number of repairs (and repair rate) indicates both the expected time period between the seismic events that will result in repairs and their probability of occurrence. The higher the probability of occurrence and intensity of seismic events, the larger the ground motion intensity and therefore the larger the repair rate.

In this embodiment, two objectives—arrangement cost and number of potential repairs—are considered. Other objectives can be easily integrated into the method of the embodiment if they can be computed as an integral of some quantity along the path. Effectively, this means the objectives are local and additive across multiple path segments.

The method 900 further comprises a step of determining the optimal path arrangements each including multiple path portions and respective design levels associated with the path portions based on the optimization 906. Raster-based path analysis, a conventional method, may be used to find the least accumulative cost path using Dijkstra's algorithm for cable route selection, taking into account cost minimization and earthquake survivability. But a major limitation of the raster-based path approach is that a path is restricted to use either a lateral link or a diagonal link when moving from a cell to adjacent cells, and it may not be able to obtain solutions of acceptable quality in a reasonable running time for realistic large scale problems.

In the present embodiment, the method 900 for determining the optimal path can be approached by first converting the multi-objective variational problem into a single objective variational problem using the weighted sum method. Pareto optimal path can be obtained by solving an extended Eikonal equation, using the Fast Marching Method (FMM), taking in account of the trade-off between arrangement cost and repair rate. The method in the present example also considers non-homogeneous cables (i.e. segments of cables at more than one design levels) and the shape of cables (path planning) for determining an optimal path within a shorter running time with a better solution quality.

Modeling

Models are for designing the path and selecting the design level of each point on the path of a cable between the starting node and the destination along the Earth's surface or buried in shallow ground. Three models are described below.

A. Earth's Surface Model

In this embodiment, the Earth's surface is approximated by using a triangulated piecewise-linear two-dimensional manifold M in $R_3$. Each point on M is denoted by a three-dimensional coordinates (x, y, z), where $z=\xi(x, y)$ is the altitude of geographic location (x, y).

B. Laying Cost Model

As mentioned above, the arrangement cost is affected by various factors and can vary from one location to another. For a point $X=(x, y, z) \in M$, $z=\xi(x, y)$, $u:M \rightarrow U$ is used to represent the design level at X. Without loss of generality, the design level variable u is assumed to take values of positive integers and $U=\{1, 2, \ldots, L\}$ is assumed to be same for all the points on M. The set of design levels for a cable is defined as $U=\{u(\cdot):M! \rightarrow U\}$. Function h (X; u) is defined to represent the unit length laying cost of design level $u \in U$ at X. The definition of h (X; u) enables it to incorporate parameters associated with the location and the design level as dependent factors influencing laying cost. Examples for such parameters include the local site attributes (e.g. soil type, elevation, etc.), labour, licenses (e.g. right of way) and protection level.

To construct a cable γ to connect the two nodes A and B in M, the laying cost of the cable γ with design levels u $(\cdot) \in U$ is represented by H (γ, u(·)). By the additive assumption of laying cost H (γ, u (·)) can be represented as $$H(\gamma, u(\cdot)) = \int_\gamma h(X, u(X)) ds \tag{1}$$

Assigning appropriately high positive real numbers to the function h (X; u) enables avoidance of problematic areas.

C. Cable Repair Model

The term repair rate is used to indicate the predicted number of repairs per unit length of the cable over a fixed time period into the future, including the design level variable u. The repair rate at location $X=(x, y, z) \in M$, $z=\xi(x; y)$ is defined as g (X, u); $u \in U$, where u is the design level at X. For the same location X on a cable, the repair rate caused by an earthquake is lower if higher design level is adopted, and vice versa. As discussed, a higher design level indicates higher laying cost and reduced number of repairs. In other words, h $(X, u_1) \leq$ h $(X, u_2)$ and $g(X, u_1) \geq g(X, u_2)$ if $u_1 < u_2$ for any $X \in M$.

The high correlation between the repair rate and the ground motion intensity measure (e.g., Peak Ground Velocity) is accommodated in this embodiment, which is widely accepted in civil engineering. Let G ($\gamma$, u (·)) denotes the total number of repairs of a cable $\gamma$, assuming that G ($\gamma$, u(·)) is additive. That is, G($\gamma$, u(·)) can be rewritten as $$G(\gamma, u(\cdot)) = \int_\gamma g(X, u(X)) ds \quad (2)$$

where g $(X, u(X)) \in R_+^1$ is the repair rate with a particular design level u at location X.

Problem Formulation and Solution

The following provides the detailed mathematical formulation of the link path planning problem and then introduced the methodology of this embodiment. Based on the models of landforms, construction cost, and the potential required repairs, the multi-objective optimization problem of minimizing the construction cost and the total number of repairs is as follows:

$$\min_{\gamma, u(\cdot)} \Phi(\gamma, u(\cdot)) = (H(\gamma, u(\cdot)), G(\gamma, u(\cdot))), \quad \text{(Problem 1)}$$
$$\text{s.t. } \gamma(A) = A, \gamma(B) = B$$

where $\gamma$ is the cable that connects Start Node A and Destination Point B and $u(\cdot) \in U$ is the set of design levels for the cable $\gamma$.

To compute the two objectives of the cable $\gamma$, the natural parametrization of a curve is introduced: the curve $\gamma$ is parameterized by a function of arc length denoted by s, and each point X on the cable $\gamma$ can be represented by a function of s, i.e. X=X(s). Using the natural parametrization of $\gamma$ and redefine u: $R_+ \cup \{0\}$, Equation (1) and Equation (2), we can rewrite $$H(\gamma, u(\cdot)) = \int^{l(\gamma)} h(\gamma(s), u(s)) ds,$$

$$G(\gamma, u(\cdot)) = \int^{l(\gamma)} g(\gamma(s), u(s)) ds \quad (3)$$

where h ($\gamma$(s), u (s)), g ($\gamma$(s), u (s)) are the unit laying cost and the repair rate at location $\gamma$ (s) with a specified seismic design level u (s), respectively, and l($\gamma$) represents the total length of the cable $\gamma$.

The two objectives, arrangement cost and the total number of repairs, are conflicting. In general, it is impossible to simultaneously optimize both the construction cost and the total number of repairs. Therefore, a set of Pareto optimal solutions are sought. This problem is reduced to a multi-objective variational problem, if only one seismic design level is considered, i.e. L=1.

Problem 1 is converted into a single-objective optimization problem by weighting the two objectives as follows.

$$\min_{\gamma, u} \Phi'(\gamma, u(\cdot)) = \int_0^{l(\gamma)} f(\gamma(s), u(s)) ds, \quad \text{(Problem 2)}$$
$$\text{s.t. } \gamma(0) = A, \gamma(l(\gamma)) = B$$

where $f(\gamma(s), u(s)) = h(\gamma(s), u(s)) + c \cdot g(\gamma(s), u(s))$ and $c \in R_+^1 \cup \{0\}$.

The following theorem shows that a set of Pareto optimal solutions of Problem 1 can be obtained by solving Problem 2.

Theorem 1

If ($\gamma^*$;u*(·)) is an optimal solution for Problem 2, then it is Pareto optimal for the laying cost H and the total number of repairs G.

For any point $S \in M$, we define a cost function $\phi$ (S) that represents the minimal cumulative weighted cost to travel from End Point B of the cable to point S as $$\phi(S) = \min_{\beta, u(\cdot)} \int_0^{l(\beta)} f(\beta(s), u(s)) ds \quad (4)$$

where $\beta \in$ Lip([0, +$\infty$); M) is a Lipschitz continuous path parameterized by its length, $$\|\beta'(s)\| = \left\|\frac{d\beta(s)}{ds}\right\| = 1,$$

X (0)=$X_B$, and X(l($\beta$))=$X_s$. By Equation (4) and the definition of $f$, and applying the fundamental theorem of the calculus of variations, it has been shown that the optimal paths are the gradient descent contours of a specific Eikonal equation.

Theorem 2

$\phi$(S) is the viscosity solution of the following Eikonal equation, $$\|\nabla \phi(S)\| = \min_u f(S, u), \phi(B) = 0 \quad (5)$$

where $\nabla$ is the gradient operator and $\|\cdot\|$ is the 2-norm.

For any point S, $\phi$(S) is called the level set function; that is, $\{S \in M : \phi(S) = a\}$ is a curve composed of all the points that can be reached from point B with minimal cost equal to a. The optimal path (s) is (are) along the gradient of $\phi$(S); i.e., orthogonal to the level curves. From Problem 2 and Equation (5), it can be observed that the joint optimization of the path $\gamma$ and the design levels u(·) has been decomposed into two separate stages, of which the first stage is to calculate the minimum weighted cost value over all design levels for each point $S \in M$, and the second stage is to solve the Eikonal equation.

Theorem 2 shows that FMM can be applied to solve Problem 2. FMM is a computationally efficient and convergent algorithm, to solve the Eikonal equation. Here, for each point $S \in M$, an additional step of calculating the minimum weighted cost value over all design levels; that is, $\min_{u \in U} f$ (S, u), has to be executed before running FMM. This means for a fixed weight value c, once the minimum weighted cost value $f'(S) = \min_{u \in U} f(S, u)$ for each $S \in M$ is derived, $f'$ (S) can be input into the FMM, and the corresponding Pareto optimal solutions can be obtained. By varying the weight value c in the calculation of the single combined objective function Problem 2, a Pareto optimal set of Problem 1 is obtained.

The method of this embodiment provides an algorithm, called Algorithm 1, for optimizing both the path planning and design levels.

| Algorithm 1 - Algorithm for optimization of both the path planning and design levels in the region of interest D |
|---|
| Input: Region D (modeled as M), spatially distributed PGV data and laying cost data for each design level u on D, mesh size $\Delta_x$, $\Delta_y$, Start Point A, End Point B, c, step size $\tau$;<br>Output: Path $\gamma$ and design level $u(\gamma)$ with minimum weighted cost;<br>1: Discretize D rectangularly with $\Delta_x$ in x and $\Delta_y$ in y, and denote the set of points on the grid, by $\Gamma$;<br>2: Based on the PGV data on D, calculate the repair rate $g(i,j,u)$ for each grid point $(i,j) \in \Gamma$ and design level u;<br>3: For each point $(i,j) \in \Gamma$, let $f'(i,j) = \min_u (h(i,j,u)+c \cdot g(i,j,u))$, where $h(i,j,u)$ is the laying cost at grid point $(i,j)$ with design level u;<br>4: Create edges, faces and obtain a complete triangulation (i.e., M) of D based on $\Gamma$;<br>5: Denote the approximate value of $\phi$ by $\phi$ satisfying $\phi(i,j) = \phi(i\Delta_x + x_B, j\Delta_y + y_B)$. Let $\phi(0,0) = 0$ and set End Point B to Near. Define the neighbors of a grid element $(i,j)$ to be the set $\Gamma_{(i,j)}$.<br>6: while Near list is not empty do<br>7:    Find a point $(i,j)$ with the minimum value $\phi$ in Near list, and set it to be Frozen.<br>8:    For each point $(i',j') \in \Gamma_{(i,j)}$, if $(i',j')$ is not Frozen, for each face $\varsigma \in \Sigma$, $\Sigma = \{\varsigma,(i',j') \in \varsigma\}$, calculate $\phi(i',j')$ and update its value with the minimum one using Equations (10) or (11) in [9].<br>9:    If $(i',j')$ is Far, update its value by $\phi(i',j')$ and add it in the Near list; otherwise update its value by minimum of $\phi(i',j')$ and its current value.<br>10: end while<br>11: Let $\gamma_0 = A$ and $k = 0$.<br>12: while $\|\gamma_k - B\|^2 > \epsilon$ do<br>13:    Compute the gradient $G(\gamma_k)$ using finite-difference based on Equation (6) in [9].<br>14:    Compute $\gamma_{k+1} = \gamma_k - \tau G(\gamma_k)$, when $\gamma_k$ is an approximation of $\gamma(t)$ at time $t = k\tau$.<br>15:    Let $u(\gamma_{k+1})$ be the design level of the grid point nearest to $\gamma_{k+1}$.<br>16: end while<br>17: return $\gamma$ and $u(\gamma)$. |

[9]: Wang Z. et al., "Multiobjective path optimization for critical infrastructure links with consideration to seismic resilience" Computer-Aided Civil and Infrastructure Engineering, vol. 32, no. 10, pp. 836-855, October 2017.

Comparing with the multi-objective variational optimization problem without considering multiple design levels, the only additional computational cost is caused by calculating $f'(S)$. Note that the computational complexity of FMM is $O(N\log(N))$, where N is the number of nodes in M, enabling applicability to large scale problems.

Applications

This section illustrates the applications of Algorithm 1 to scenarios based on 3D realistic scenarios. Without loss of generality, two seismic design levels are assumed in these two scenarios; Levels 1 and 2 with low and high level protection respectively. Considering the trade-off between the laying cost and the total number of repairs, the Pareto optimal solutions are obtained and the corresponding (approximate) Pareto front is generated. In addition, the FMM-based method is compared to the IS-based algorithm (Algorithm 1) and LS-IP algorithm. The codes are run in Matlab R2016b on a Lenovo ThinkCenter M900 Tower desktop (64 GB RAM, 3.4 GHz Intel® Core™ i7-6700 CPU).

A. The First Scenario

Figure 10:
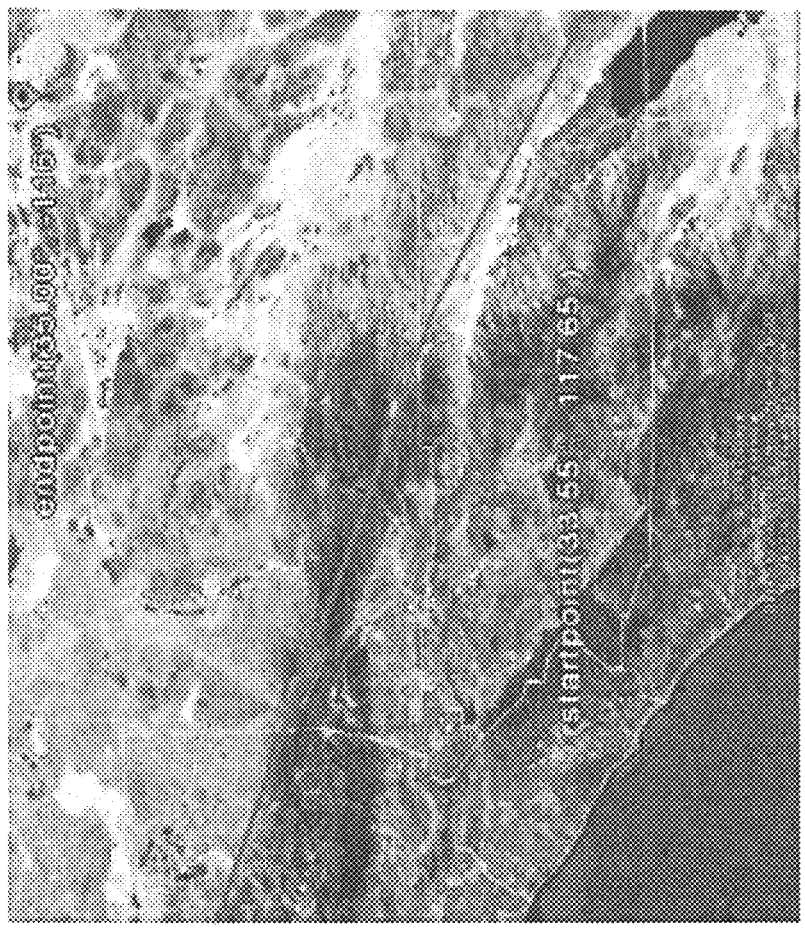
FIG. 10 is a map showing an exemplary region D1, wherein the line illustrates a fault line.

FIG. 10 shows a map of an exemplary region D1, which is located in State of California from northwest (35:00° N, −118:00° E) to southeast (33:00° N, −116:00° E). The line cutting through the region D1 illustrates the San Andreas fault line. A cable is to be laid connecting Start Point (33:55° N, −117:65° E) to End Point (35:00° N, −116:00° E) as shown in FIG. 10.

The elevation data was downloaded from the General Bathy metric Chart of the Oceans (GEBCO) and the Peak Ground Acceleration (PGA) data from USGS. The spatial resolution of the elevation data and the PGA data are 30 arc-second and 180 arc-second, respectively. The equation 6 is used to convert PGA to Peak Ground Velocity (PCV) for calculating repair rate of the cable as follows, $$\log_{10}(v)=1.0548 \cdot \log_{10}(PGA)-1.5566 \tag{6}$$

where v (cm/s) represents the PGV value.

Figure 11:
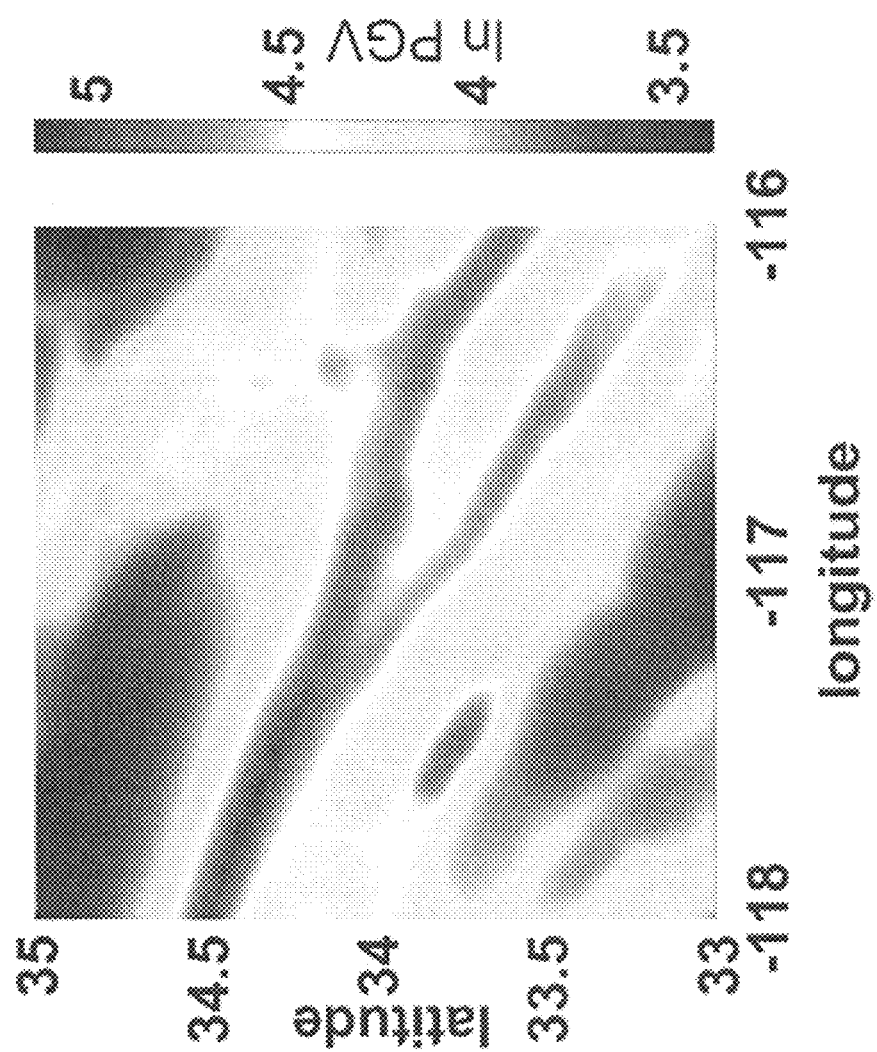
FIG. 11 is a shaded surface map of Peak Ground Velocity (PGV) for region D1 in log scale.

FIG. 11 shows a shaded surface map of Peak Ground Velocity (PGV) for region D1 in log scale. Referring to FIG. 10 and FIG. 11, if a cable is laid from Start Point to End Point, it has to pass through a high risk area due to the existence of San Andreas fault line. Since the spatial resolution of the PGA data is lower than that of the elevation data, and the computational complexity of the FMM-based method is lower than that of the LS-based algorithm, the elevation data is first downsampled to the level of the resolution of the PGA data (i.e., 180 arc-second) in order to compare the FMM-based method with the IS-based algorithm. Therefore, two sets of data are used: the original PGA data and the downsampled elevation data, which is call the low-precision data herein.

To show the benefit of deriving better approximate Pareto front using high resolution data and to take advantage of the computational efficiency of the FMM-based method, high-precision data is then generated by interpolating the PGA data (i.e., complementing missing data by interpolation) to make it have the same spatial resolution as the original elevation data (i.e., 30 arc-second). Then, the FMM-based method is applied to both the low-precision data and the high-precision data. As mentioned, the LS-based algorithm is applied to the low-precision data only since it cannot be used to obtain the Pareto front in a reasonable time for the high-precision data. Thereafter, the LS-based algorithm using the low-precision data is compared with the FMM-based method.

FIGS. 12A, 12B, 12C, 12D, 12E and 12F are Pareto optimal paths modelled on the PGV map of region D1 using high-precision data, where in each of these Figures, the 3D topographic landform shown is on the left and the corresponding 2D logarithmic PGV from top view is on the right, and where the magenta lines indicate the cable or cable segments adopting Level 1, and the black lines indicate the cable or cable segments adopt Level 2.

The corresponding data collected from each of the Pareto optimal paths in FIGS. 12A-12F, including the laying cost H ($\gamma^*$; $u^*(\cdot)$) and total number of repairs G ($\gamma^*$; $u^*(\cdot)$) are shown in Table II.

TABLE II

| | c | $H(\gamma^*, u^*(\cdot))$ | $G(\gamma^*, u^*(\cdot))$ |
|---|---|---|---|
| a | 0 | 220.7205 | 42.5164 |
| b | 3.8 | 222.3874 | 41.6790 |
| c | 0.2 | 276.6942 | 29.6408 |
| d | 10.5 | 421.0422 | 13.0290 |
| e | 24 | 491.5120 | 8.5157 |
| f | 500 | 534.2173 | 8.0231 |

Referring back to FIGS. 12A-12F, example ways of reducing risk (lower number of repairs) may be by adding segments with high level protection (see the black lines as shown in FIG. 12C) and by increasing the length of the cable to avoid the high risk areas shown in FIG. 12B. Additionally, the laying cost increases and the total number of repairs decreases when some parts of the cable have high level protection.

Figure 12A:
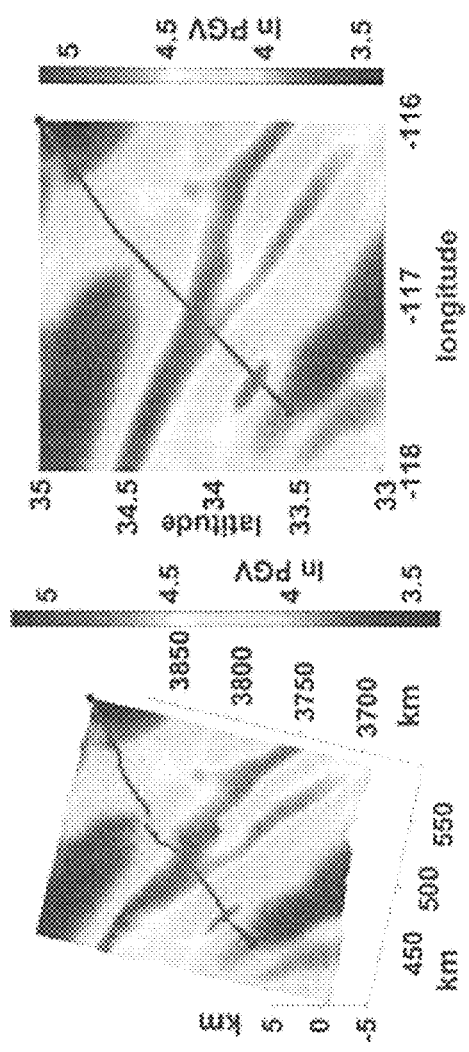
FIGS. 12A, 12B, 12C, 12D, 12E and 12F are Pareto optimal paths modeled on the PGV map of region D1, where the magenta lines indicate the cable or cable segments being adopted at a first design level, and the black lines indicate the cable or cable segments being adopted at a second design level.
Figure 12B:
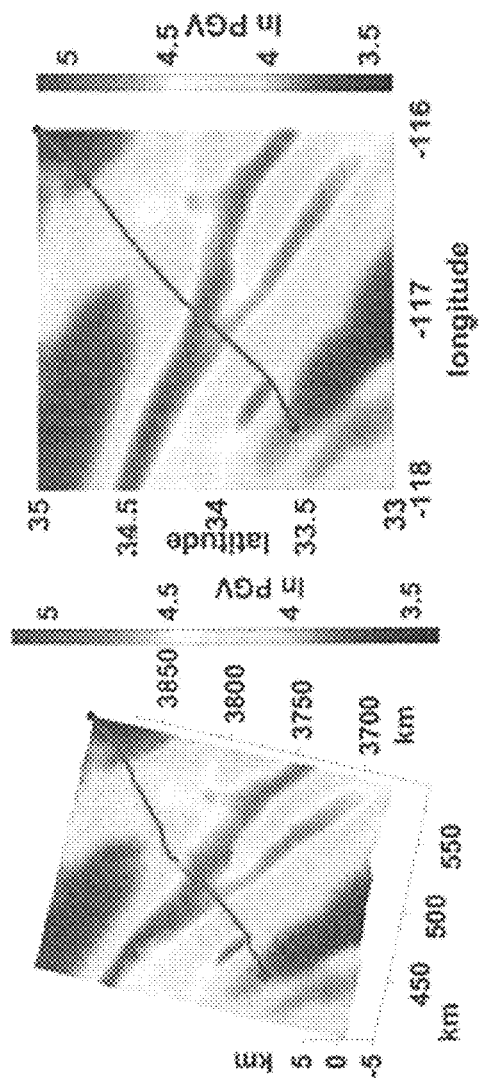
Figure 12C:
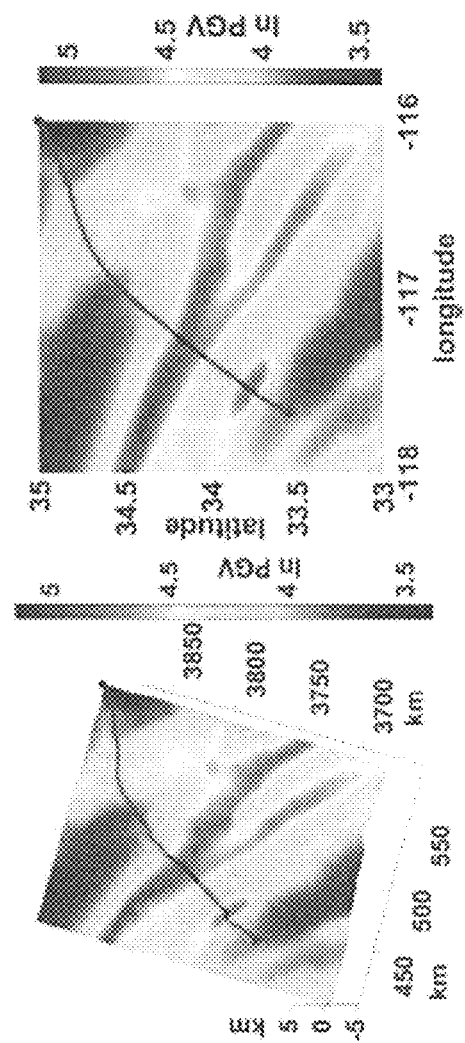
Figure 12D:
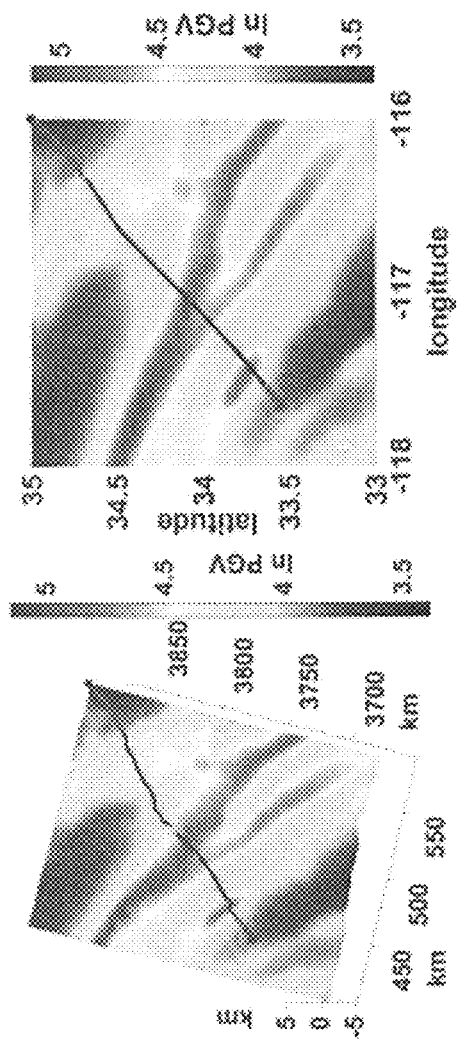
Figure 12E:
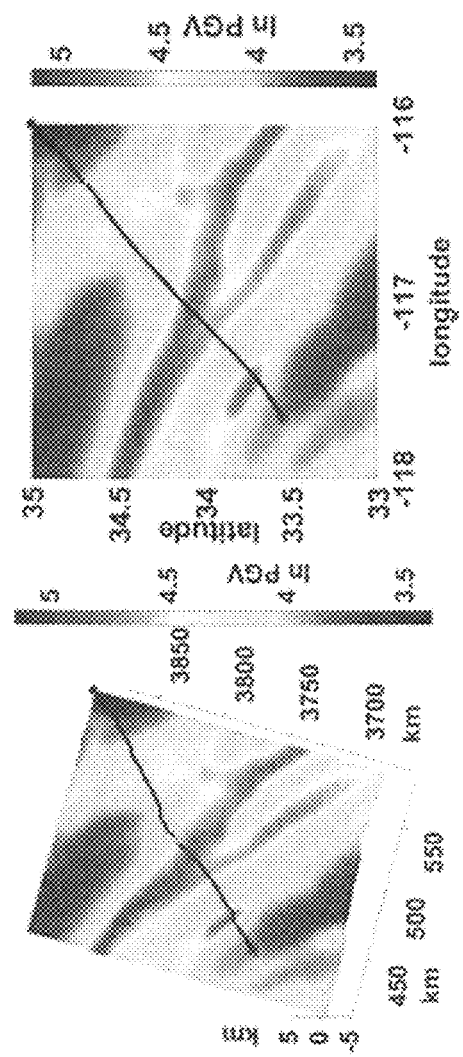
Figure 12F:
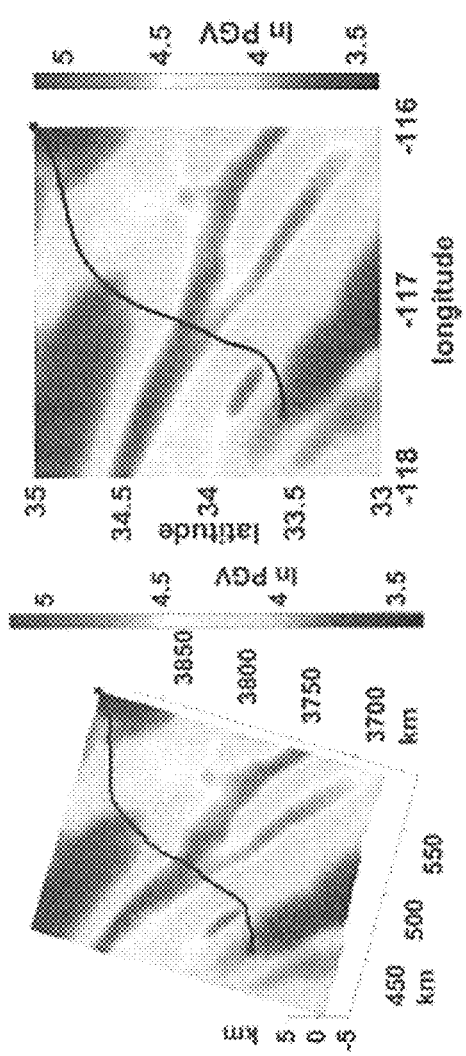

From FIG. 12A and FIG. 12B, the cable is designed to keep away from the high PGV areas to reduce the total number of repairs. However, it is evident from Table IT that avoiding the high PGV areas is not an effective way to decrease the total number of repairs of the cable. In this scenario, the San Andreas fault line cuts through the objective region D. This implies that the designed path has to pass through the high PGV areas and a higher design level should be adopted for the cable deployed in such high risk areas. Adopting a higher design level for some parts of the cable is noticeable, and these higher level protected segments become longer around the high PGV areas as shown by FIG. 12C and FIG. 12D. The reduction of the total number of repairs is significant but with an increased laying cost by deploying a higher design level for the cable.

Table II shows the trade-off between the laying cost and the total number of repairs. In order to generate the (approximate) Pareto front, the weight value c may be varied from 0 to 1000. As the weight value c increases, the laying cost increases and the total number of repairs decreases. In other words, the higher the laying cost, the lower the total number of repairs.

Figure 13:
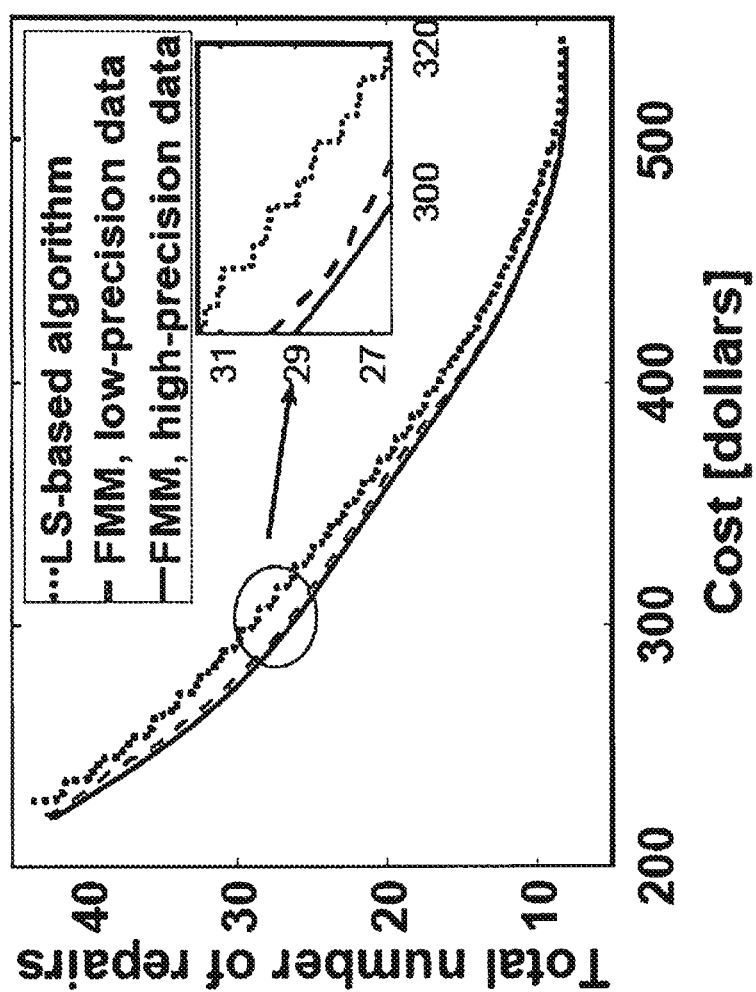
FIG. 13 is a graph showing non-dominated front for two objectives—total number of repairs and cable laying cost, where the red dash line illustrates Pareto front obtained by Fast Marching Method (FMM) with low-precision data, the black solid line illustrates Pareto front obtained by FMM with high-precision data, and the blue dash line illustrates Pareto front obtained by Label-Setting (LS) algorithm with low-precision data.

FIG. 13 is a graph showing non-dominated front for two objectives—total number of repairs and cable laying cost, where the red dash line illustrates Pareto front obtained by Fast Marching Method (FMM) with low-precision data, whereas the black solid line illustrates Pareto front obtained by FMM with high-precision data. The (approximate) Pareto fronts consist of 451 points and 841 points. The FMM-based method that uses data with higher precision generates more accurate path planning and a better approximation for the Pareto front. The blue dash line illustrates Pareto front obtained by Label-Setting (LS) algorithm with low-precision data, and the Pareto front (consists of 1381 points) is obtained by the LS-based algorithm using the low-precision data.

FIG. 13 shows that for the same total number of repairs, the laying costs obtained by FMM-based method using both the low-precision data and the high-precision data are smaller than that obtained by the LS-based algorithm. If the total number of repairs is set to be the same and larger than 15, commonly the laying cost obtained by the FMM-based method using high-precision data will be reduced approximately by 4% comparing with the IS-based algorithm. This reduction increases to about 6.5% if the total number of repairs is set in the range of 25 to 30.

Figure 14:
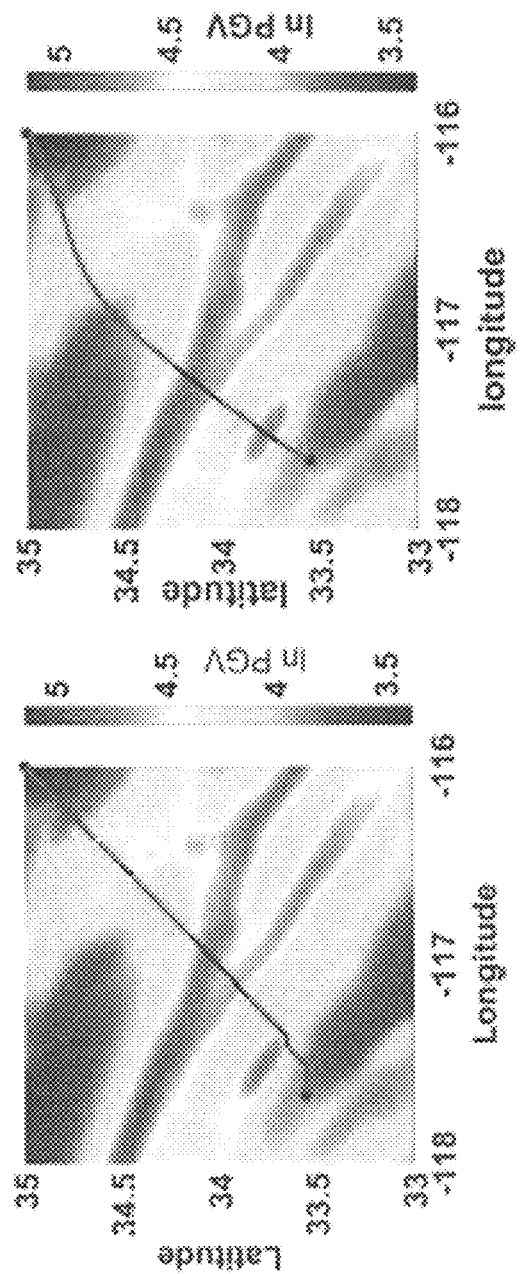
FIG. 14A is an optimal path arrangement obtained by LS algorithm on a PGV map of region D1, where the magenta lines indicate the cable or cable segments being adopted at a first design level, and the black lines indicate the cable or cable segments being adopted at a second design level.
FIG. 14B is an optimal path arrangement obtained by FMM algorithm on a PGV map of region D1, where the magenta lines indicate the cable or cable segments being adopted at a first design level, and the black lines indicate the cable or cable segments being adopted at a second design level.

FIG. 14A is an optimal path arrangement obtained by LS algorithm on a PGV map of region D1, and FIG. 14B is an optimal path arrangement obtained by FMM algorithm on a PGV map of region D1.

Table III shows the laying cost H ($\gamma^*$; $u^*(\cdot)$) and the total number of repairs G ($\gamma^*$; $u^*(\cdot)$) of the Pareto optimal path using FMM-based method and the LS-based algorithm.

TABLE III

|  | $H(\gamma^*,u^*(.))$ | $G(\gamma^*,u^*(.))$ |
| --- | --- | --- |
| LS-based algorithm | 304.1759 | 28.4903 |
| FMM-based method (hight-precision data) | 284.0619 | 28.5005 |

The two paths in FIG. 14A and FIG. 14B have very similar total number of repairs, as shown in Table Ill. The laying cost reduction is up to 6.61%. This difference is significant considering the billions of dollars spent around the world on telecommunications cabling. Although the total number of repairs of the two cables are very close, their corresponding paths are quite different.

In terms of the computational cost, it takes 251 s and 5,192 s for the FMM-based method to obtain the (approximate) Pareto fronts using the low-precision data and the high-precision data, respectively. The running time of the LS-based algorithm is 2,409 s for the low-precision data. As a result, bearing in mind the higher quality solution from the FMM-based method, it is difficult to make a case for the LS-based algorithm.

B. The Second Scenario

Figure 15:
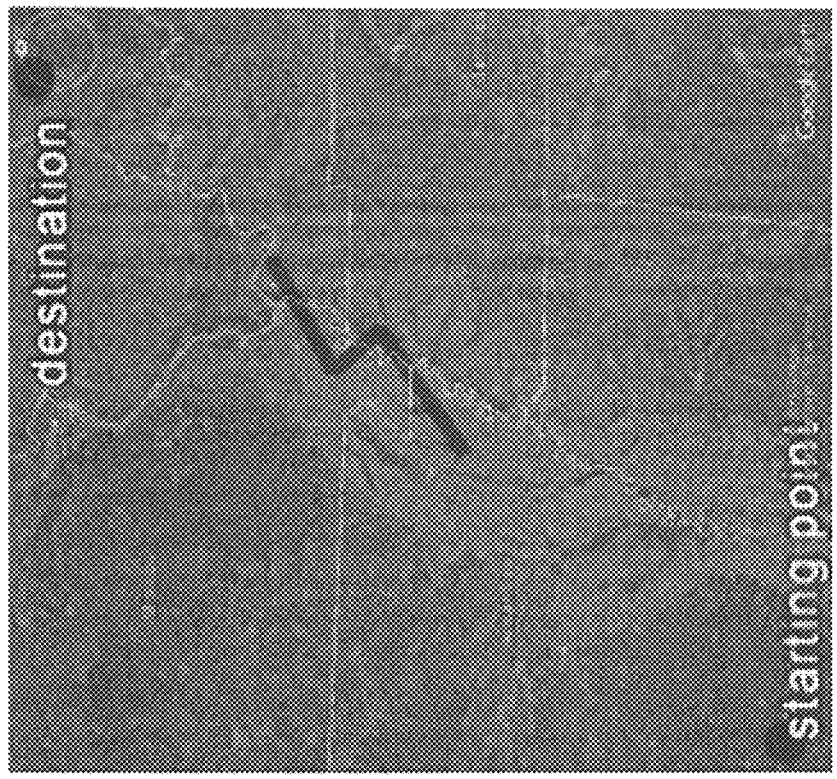
FIG. 15 is a map showing an exemplary region D2, wherein the black line illustrates a fault line.

FIG. 15 shows a map of an exemplary region D2, a large scale realistic landform in the central US. The objective region D2 is from the southwest corner (33:00° N, −93:00° E) to northeast corner (39:00° N, −87:00° E). The black line illustrates the New Madrid fault line, located in the central of D2.

Figure 16:
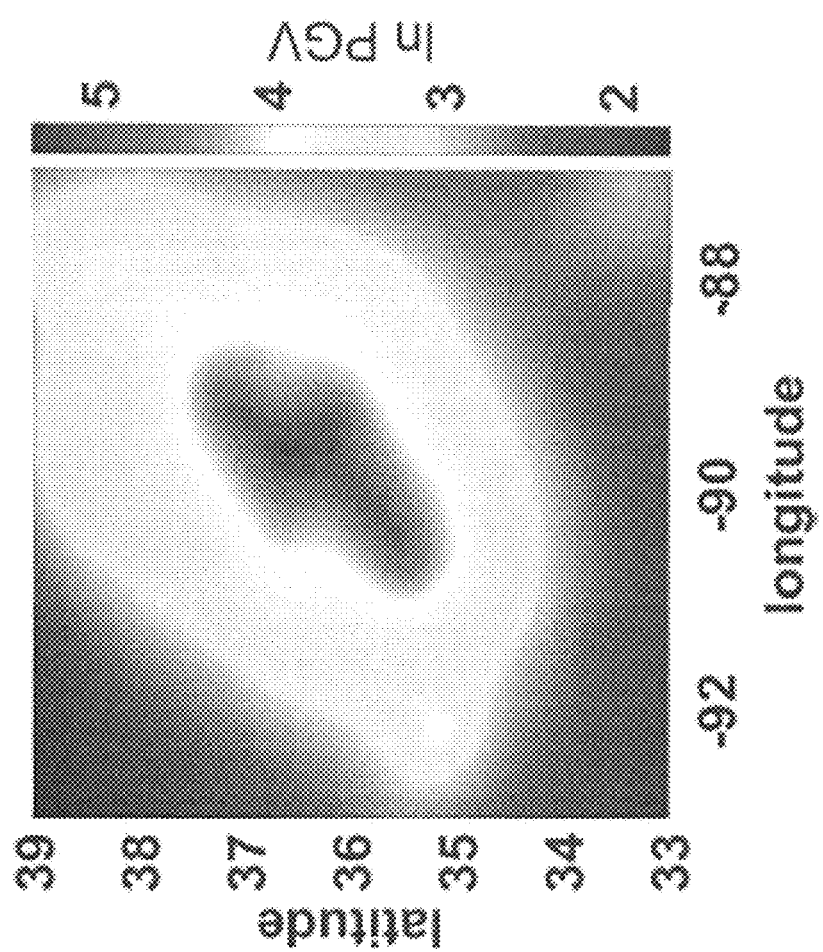
FIG. 16 is a shaded surface map of Peak Ground Velocity (PGV) for region D2 in log scale.

FIG. 16 shows a shaded surface map of Peak Ground Velocity (PGV) for region D2 in log scale. To design the path for a cable from the southwest corner (33:00° N, 93:00° E) to northeast corner (39:00° N, −87:00° E), again, the elevation data is downsampled or interpolates the PGA data to generate the low-precision data (i.e., 120 arc-second spatial resolution) and the high-precision data (i.e., 30 arc-second spatial resolution). The (approximate) Pareto fronts (consists of 754 points and 823 points), obtained by the FMM-based method using the low-precision data and the high precision data through varying the weight value c from 0 to 1200, are shown by the brown dotted line and the black solid line in FIG. 18, respectively. From FIG. 18, the (approximate) Pareto fronts obtained using the low-precision data and the high-precision data are very close. Several selected optimal paths obtained by the FMM-based method using the high-precision data are shown in FIGS. 17A-17F and the corresponding laying cost and the total number of repairs are shown in Table IV.

TABLE IV

|  | c | $H(\gamma^*, u^*(\cdot))$ | $G(\gamma^*, u^*(\cdot))$ |
| --- | --- | --- | --- |
| a | 0 | 856.1859 | 169.0890 |
| b | 0.08 | 858.5708 | 105.4468 |
| c | 3 | 915.8192 | 36.8502 |
| d | 20 | 1013.4469 | 21.8293 |
| e | 50 | 1159.4206 | 18.3306 |
| f | 800 | 2347.7978 | 4.1533 |

Figure 17A:
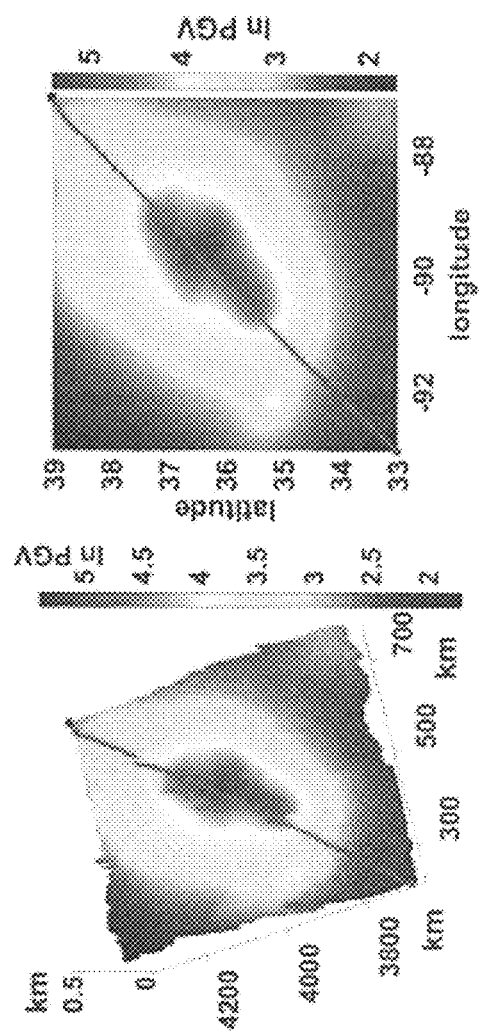
FIGS. 17A, 17B, 17C, 17D, 17E and 17F are Pareto optimal paths modeled on the PGV map of region D2, where the magenta lines indicate the cable or cable segments being adopted at a first design level, and the black lines indicate the cable or cable segments being adopted at a second design level.
Figure 17B:
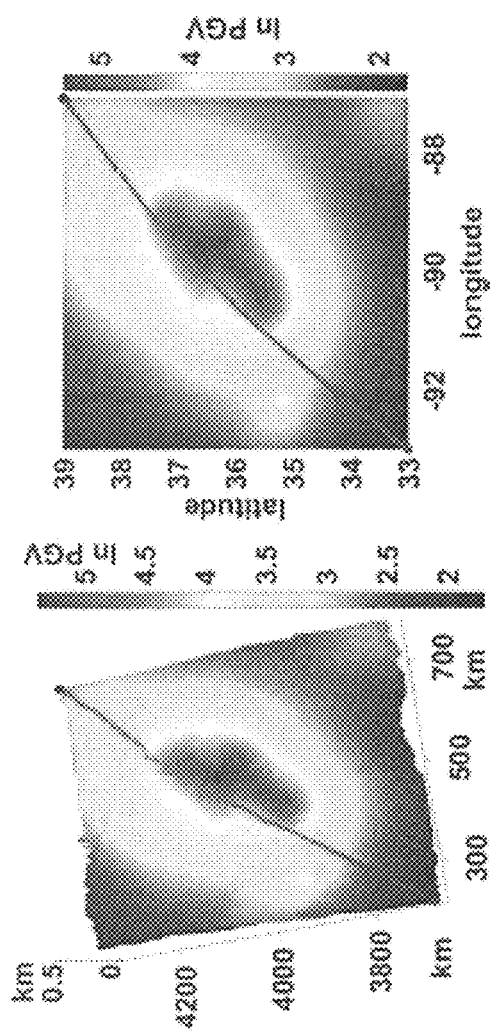
Figure 17C:
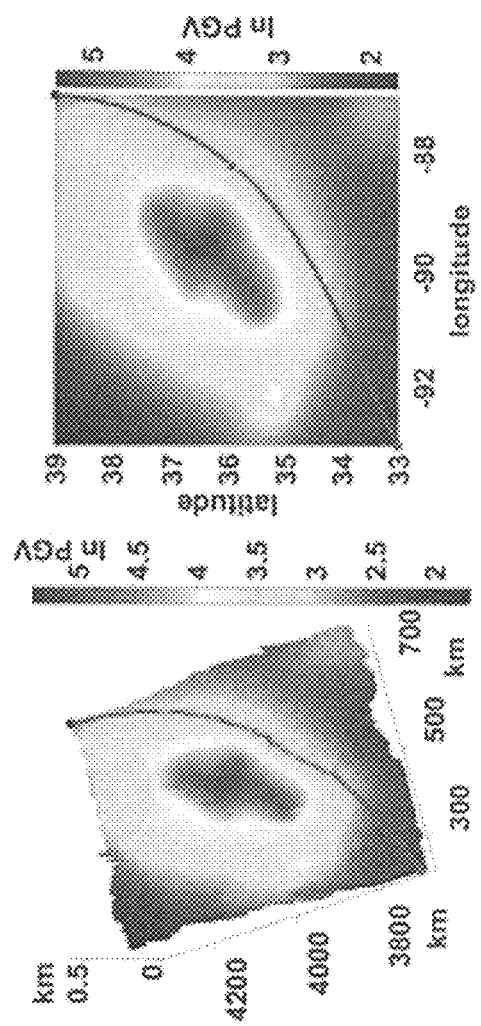
Figure 17D:
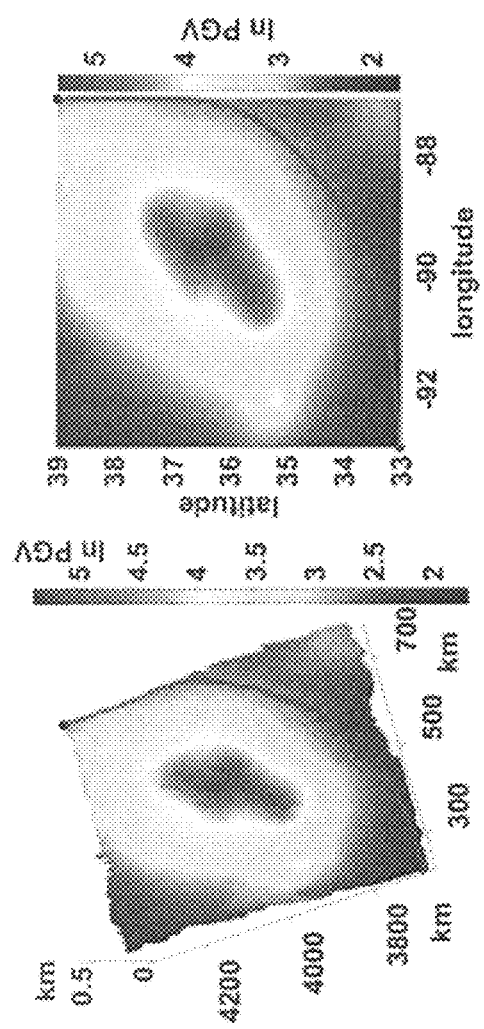
Figure 17E:
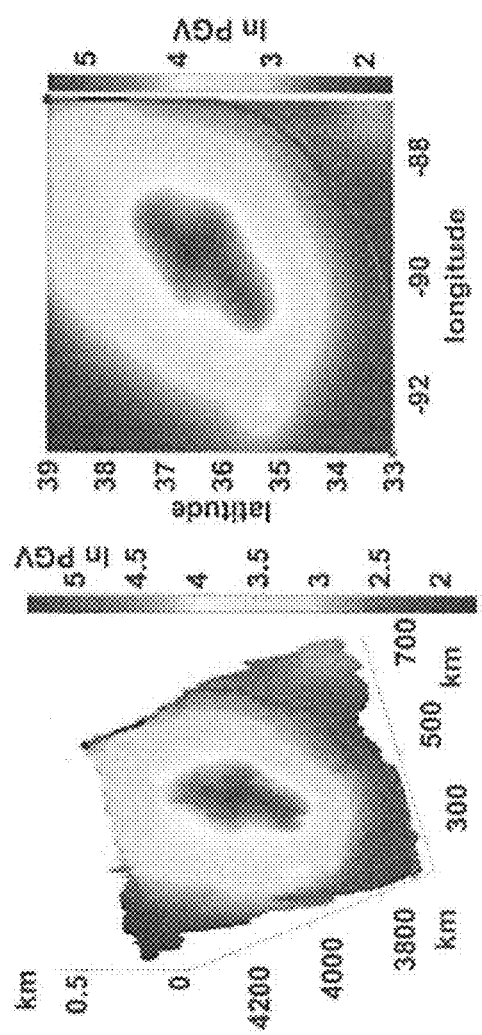
Figure 17F:
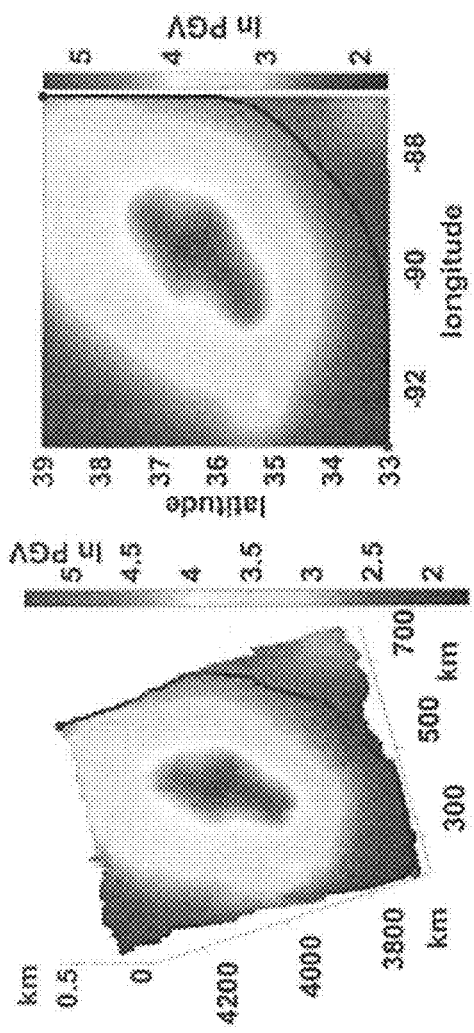

FIGS. 17A-17F are Pareto optimal paths modelled on the PGV map of region D2, where the magenta lines indicate the cable or cable segments being adopted at a first design level, and the black lines indicate the cable or cable segments being adopted at a second design level. Unlike in the first scenario, to reduce the total number of repairs of the cable in this scenario, avoiding the high PGV areas is much more effective than adopting a higher design level since the designed path can totally avoid the high PGV areas through deploying a longer cable as shown by FIG. 17C and FIG. 17D.

Figure 18:
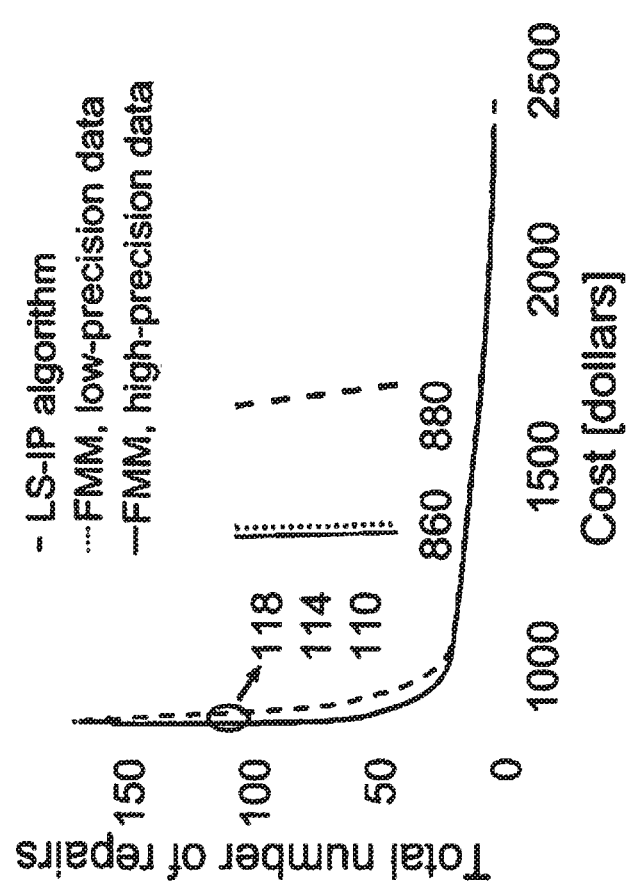
FIG. 18 is a graph showing non-dominated front for two objectives—total number of repairs and cable laying cost, where the red dash line illustrates Pareto front obtained by Fast Marching Method (FMM) with low-precision data, the black solid line illustrates Pareto front obtained by FMM with high-precision data, and the blue dash line illustrates Pareto front obtained by Label-Setting (LS) algorithm with low-precision data.

FIG. 18 is a graph showing non-dominated front for two objectives—total number of repairs and cable laying cost, where the red dash line illustrates Pareto front obtained by Fast Marching Method (FMM) with low-precision data, the black solid line illustrates Pareto front obtained by FMM with high-precision data, and the blue dash line illustrates Pareto front obtained by Label-Setting (LS) algorithm with low-precision data.

The raster-based LS-based algorithm is not applicable for such a large scale landform even when the low-precision data is used. Therefore instead, LS-IP algorithm is run using the low-precision data by setting $\varepsilon=0.8$, obtaining the Pareto front (consists of 336 points) shown by the blue dash line in FIG. 18. Note that the number of nodes of the generated graph is too large to obtain the Pareto front for LS-IP if the high-precision data is used. From FIG. 18, it is observed that the FMM-based method performs at least as well as the LS-IP algorithm. But if the total number of repairs is set in the range of 25 to 100, typically a more than 3.5% laying cost reduction is obtained by applying the FMM-based method.

In term of computational cost, the running time for the FMM-based method using the low-precision data, the high-precision data and LS-IP, are 1,308 s, 62,526 s and 15,334 s, respectively. It is seen, again, that the FMM-based method has much better performance than LS-IP on computational cost if the same data is used.

Based on the above first and second scenarios, it is evident that the FMM-based method not only performs better on finding the approximate Pareto front, but also runs much faster than the LS-based algorithm and the LS-IP algorithm. For the Problem 1 with a very large scale landform, the FMM-based method can be adopted because of its efficiency and solution quality.

Advantage

The method in the embodiment has provided an optimal and computationally effective approach to solve the multi-objective optimization problem, taking into account of laying cost and total number of repairs of the cable as the two objectives. Whereby solving the problem allows the determination of optimal path arrangements for an infrastructure link between two geographic locations. Advantageously, the present example also considers the path optimization and non-homogenous construction problem for a cable connecting two points on Earth's surface with high risk areas when multiple design levels are available.

Comparing with the existing raster based algorithms, namely, the LS-based algorithm and the LS-IP algorithm, the FMM-based method in the present example is advantageous in that it has a better performance both on the approximation of Pareto fronts and the computational cost.

Exemplary System

Figure 19:
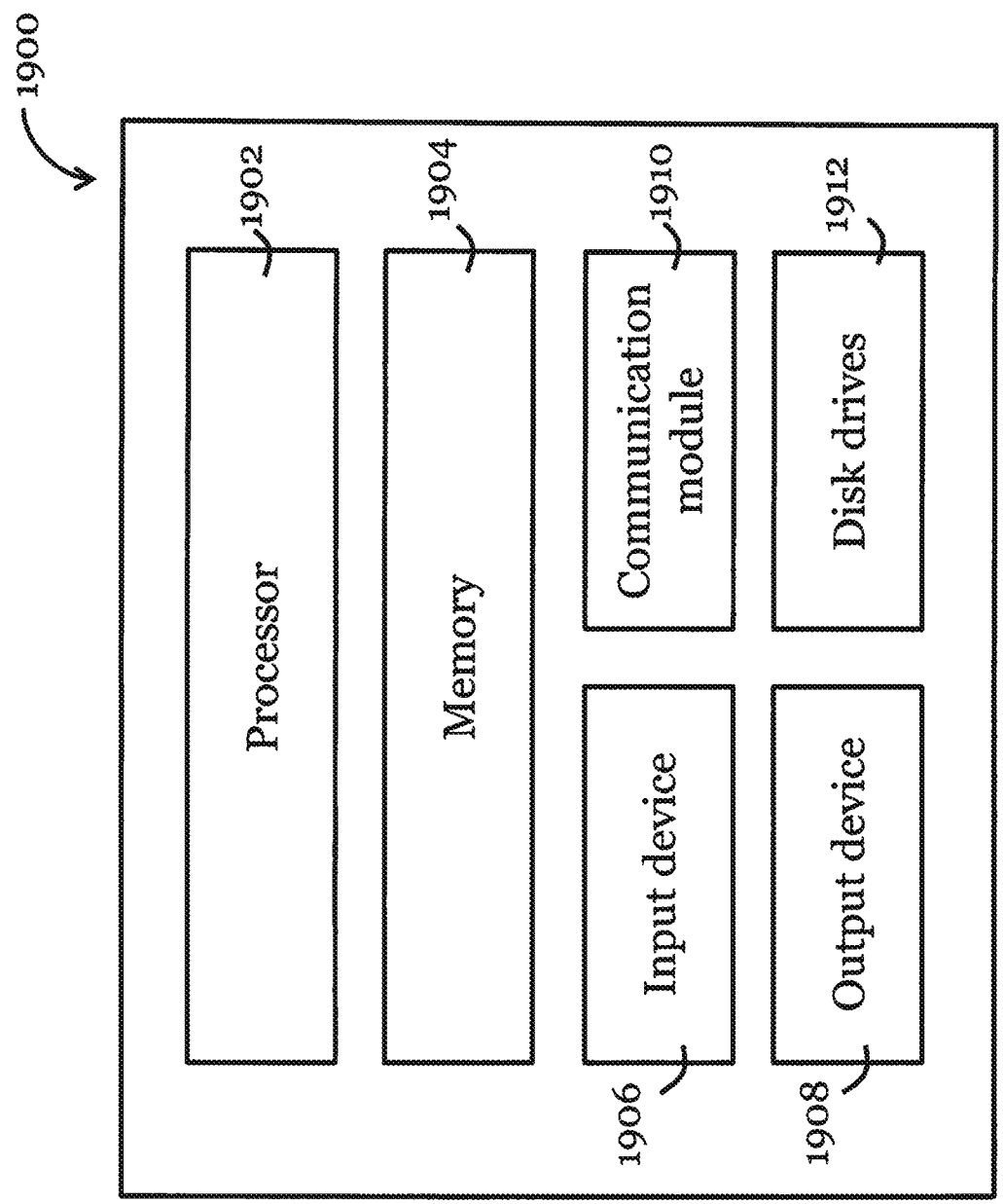
FIG. 19 is an information handling system that can be configured to operate the method of FIG. 9.

Referring to FIG. 19, there is shown a schematic diagram of an exemplary information handling system 1900 that can be used as a server or other information processing systems in one embodiment for performing the method in the embodiments in this example. Preferably, the server 1900 may have different configurations, and it generally comprises suitable components necessary to receive, store and execute appropriate computer instructions or codes. The main components of the server 1900 are a processing unit 1902 and a memory unit 1904. The processing unit 1902 is a processor such as a CPU, an MCU, etc. The memory unit 1904 may include a volatile memory unit (such as RAM), a non-volatile unit (such as ROM, EPROM, EEPROM and flash memory) or both. Preferably, the server 1900 further includes one or more input devices 1906 such as a keyboard, a mouse, a stylus, a microphone, a tactile input device (e.g., touch sensitive screen) and a video input device (e.g., camera). The server 1900 may further include one or more output devices 1908 such as one or more displays, speakers, disk drives, and printers. The displays may be a liquid crystal display, a light emitting display or any other suitable display that may or may not be touch sensitive. The server 1900 may further include one or more disk drives 1912 which may encompass solid state drives, hard disk drives, optical drives and/or magnetic tape drives. A suitable operating system may be installed in the server 1900, e.g., on the disk drive 1912 or in the memory unit 1904 of the server 1900. The memory unit 1904 and the disk drive 1912 may be operated by the processing unit 1902. The server 1900 also preferably includes a communication module 1910 for establishing one or more communication links (not shown) with one or more other computing devices such as a server, personal computers, terminals, wireless or handheld computing devices. The communication module 1910 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 1902, the memory unit 1904, and optionally the input devices 1906, the output devices 1908, the communication module 1910 and the disk drives 1912 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 1900 shown in FIG. 19 is merely exemplary and that different servers 1900 may have different configurations and still be applicable in the present example.

Although not required, the embodiments described with reference to the FIGS. 9-19 can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of this example are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to this example as shown in the specific embodiments without departing from the spirit or scope of this example as broadly described. For example, the method can be applied to determine optimal laying arrangement of any infrastructure link, including fluid pipeline (e.g., oil, water, and gas pipes), electric power cables, electric data cables, optical cables, etc. The present embodiments are to be considered in all respects as illustrative, not restrictive.

Survivability Analysis

Figure 20:
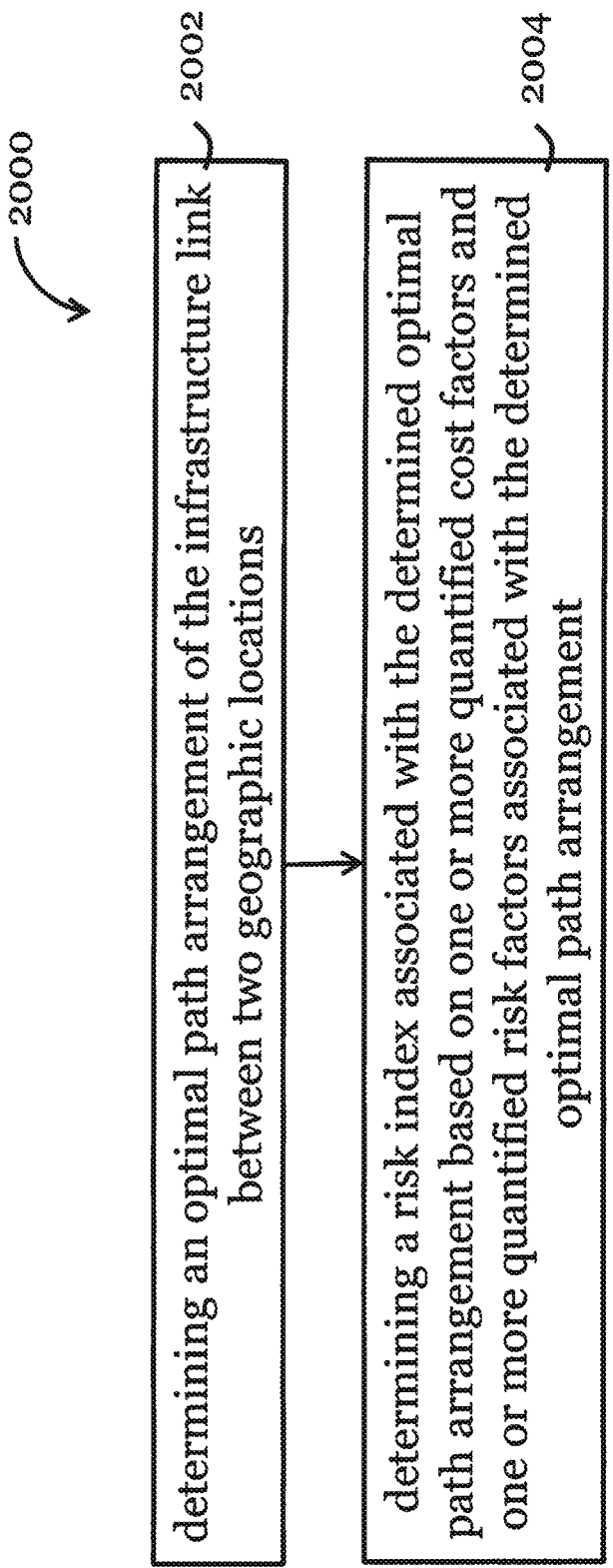
FIG. 20 is a flow diagram illustrating a method for analyzing survivability of an infrastructure link in one embodiment of the invention.

In one embodiment, the present invention provides a system and method for analyzing survivability of an infrastructure link. FIG. 20 illustrates the general method steps. The method 2000 involves first, in step 2002, determining an optimal path arrangement of the infrastructure link between two geographic locations. The determination can be made using the system and method in any of the examples described above. Then, in step 2004, the method 2000 involves determining a risk index associated with the determined optimal path arrangement based on one or more quantified cost factors and one or more quantified risk factors associated with the determined optimal path arrangement.

In one example, the risk index provides a measure for the survivability of cable systems on the Earth's surface. The risk index may reflect the risk associated with uncertainty in future taxes and fees.

The cost and risk factors may include any of the factors considered during optimization of the path in the above examples. These factors may also take into account different design considerations such as seismic hazards, slope angle, sediment hardness, water depth, fishing and anchorage area, political changes or instability, offshore concession blocks (petroleum, minerals and renewable energy), and especially uncertainty in potential increases in future taxes, fees and charges by countries for cables laid across their land. In a further embodiment, the factors can include cable break risk, risks associated with uncertain taxes and fees, and expected cost of the cable (labor, material, taxes and fees).

In one example, a higher risk index represents more expected number of failures (or repairs) over the lifetime of the cable and/or larger variations in future fees and taxes imposed by countries for cables laid across their land. In one embodiment, for cable segments deployed in high-risk prone areas, using high design levels (proper shielding or additional protection materials) for these segments can significantly decrease the total number of repairs of these cable segments but correspondingly more investment in cable laying.

In one example, determining the risk index associated with the determined optimal path arrangement includes determining a respective local risk index associated with multiple portions of the determined optimal path arrangement, wherein the respective local risk index of at least two portions are determined based on different cost and risk factors. The local risk indexes can be summed, or integrated, to obtain a risk index.

In one embodiment, the risk index is determined based on a weighted sum of the quantified cost and risk factors. The user may provide input associated with the respective weighting through an input means. The determined optimal path arrangement may be displayed on a map of the geographic terrain, preferably, with the risk index associated with the optimized path arrangement.

The risk index in the present invention can be a valuable tool to the cable owner to evaluate their insurances cost and adjust their insurance policies following the risk index, as well as for insurance companies to decide on their policies. Also, the risk model in the present invention enables different stakeholders to assign different priorities, i.e., different weightings, to different cost and risk factors, which can lead to a range of risk indexes. For example, a cable owner may assign higher weight to cost on the cable (labor material, taxes and charges) than a government, but a government may assign higher weight for potential earthquake damage to the cable, which may cause Internet shut down. The model provides a flexible and useful tool. In one implementation, the weights are determined by a group of people, e.g., in one or more organizations, enterprises, or divisions, who have vested interest. For example, the group of people may be insurance agents, government officials, politicians, etc. The group of people may be resided in different countries around the world to provide a global weighting. The group of people may also be resided in different places in the same country to provide a local weighting. One or more dedicated server, computing engine, computing network, or computing devices may be used to implement a system that stores and processes the weighting information.

The present invention may also provide, in one embodiment, a computing system for disaster management may be provided. The computing system may be arranged to determine when a disaster that affects the infrastructure link has occurred, and then broadcast related information to the relevant personnel and institutions, such as the group of people managing weighting as mentioned above. The computing system may incorporate the system that stores and processes the weighting information, or any other systems that is associated with risk determination, evaluation and relief of the infrastructure link. The computing system may provide information associated with infrastructure link failure, expected effect or duration of such failure, expected repair duration, or like information. The system may facilitate support and relief coordination.

Figure 21:
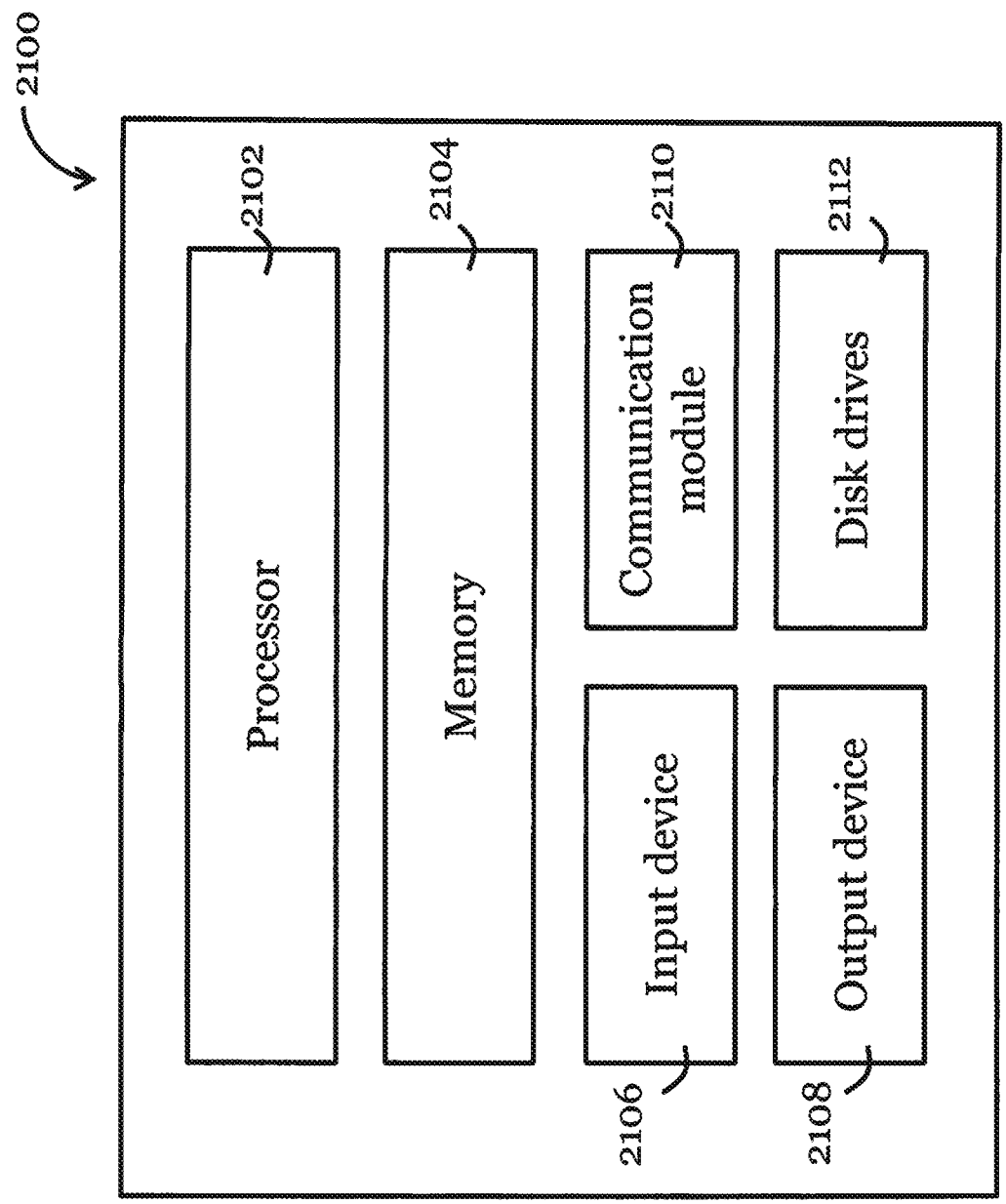
FIG. 21 is an information handling system that can be configured to operate the method of FIG. 20.
Figure 22:
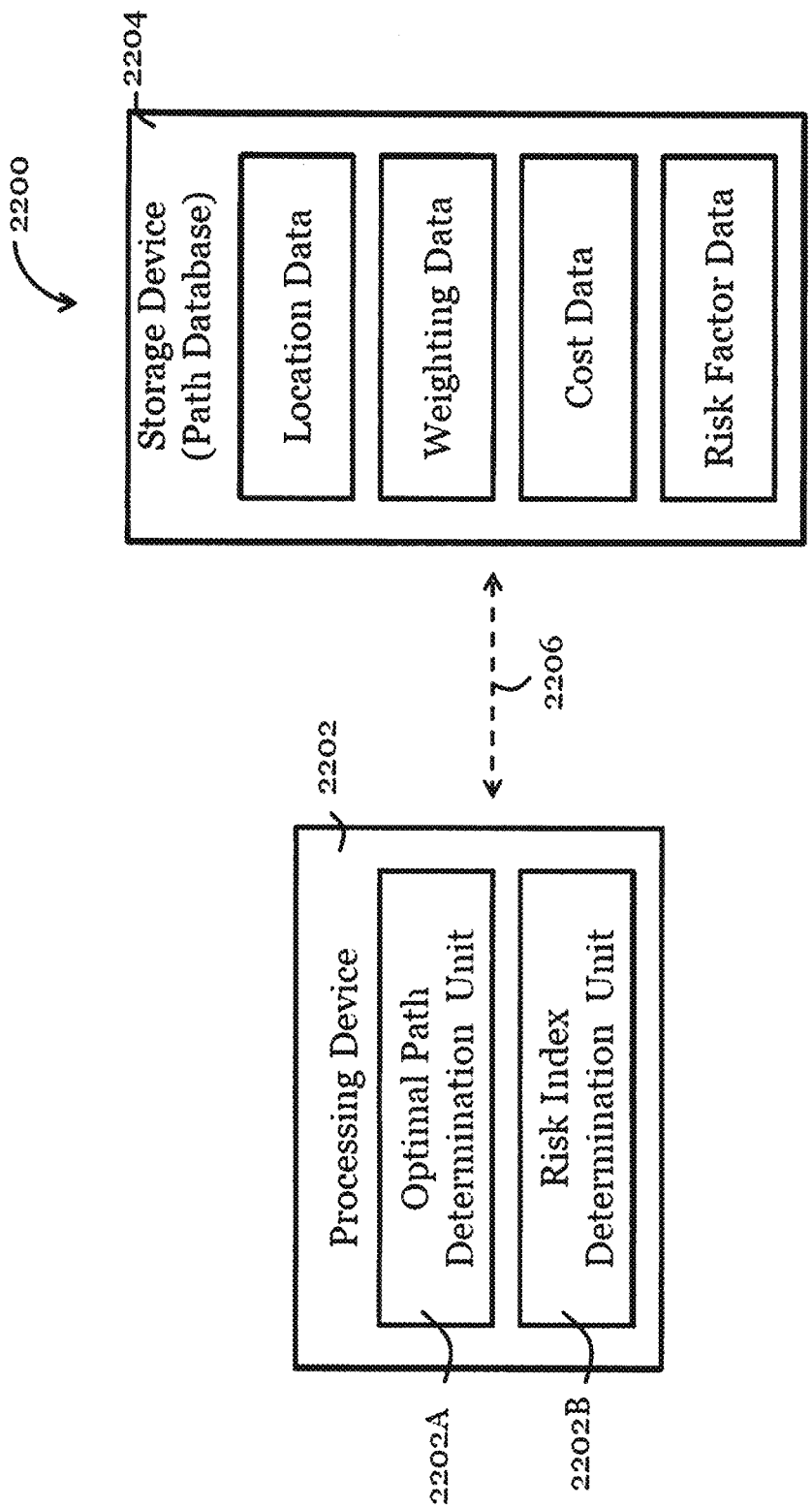
FIG. 22 shows a risk index determination system in one embodiment of the invention.

FIG. 22 shows a risk index determination system 2200 in one embodiment of the invention. The system 2200 includes a processing device 2202 and a storage device 2204 that functions as a database for storing path data. The processing device 2202 and the storage device 2204 are arranged to be in data communication with each other through a communication link 2206. The communication link 2206 may be a data bus, or any wired or wireless communication link. The processing device 2202 and the storage device 2204 may be provided by one or more information handling systems described below with respect to FIG. 21. Preferably, the storage device 2204 is arranged in a remote computing server to be accessed remotely by the processing device 2202.

The processing device 2202 includes an optional optimal path determination unit 2202A and a risk index determination unit 2202B. The optimal path determination unit 2202A is arranged for determining an optimal path arrangement of the infrastructure link between two geographic locations. The risk index determination unit 2202B is arranged for determining a risk index associated with the determined optimal path arrangement. The risk index determination may be based on quantified cost factors and/or quantified risk factors associated with the determined optimal path arrangement. The cost and risk factors are preferably weighed. The risk index, cost and risk factors, weighting, etc., be can be similar or the same as those described above.

The storage device 2204 is a database for storing existing data associated with any number of existing or previously determined infrastructure links. The data may include location data indicating the geographical location and arrangement of the determined path, its related risk factor and cost data, and associated weighting data. The storage device 2204 may be accessed by other computing device to write and/or read data. For example, a newly determined path arrangement (determined by any people, institutions, organizations, enterprises, or divisions using one or more method embodiment described above or any other methods) and associated cost, risk, weighting data could be readily stored in the database. In some examples, outdated or old path data may be updated or removed. In one example, the storage device 2204 is arranged to learn the data. Example of learning includes combining data, taking average of data, preforming regression to estimate data, etc.

In one embodiment, the data in the storage device 2204 would readily facilitate determination of the optimal path and associated risk factor. In one example, an existing optimal path (location, cost, risk, weights factors are already determined by experts or relevant institutions or bodies) is evaluated in a computing device (such as the information handling system described with respect to FIG. 21) arranged to implement the method in Examples 1 or 2. Then, an approximate Pareto front associated with the existing optimal path is obtained using any embodiment of the methods in Examples 1 and 2. If the approximate Pareto front, when compared with the related data of the existing optimal path, falls on or close to (e.g., below 5% deviation) that of the existing optimal path, then the location, cost, risk, weights, etc. associated with the existing optimal path may be stored or used for the approximate Pareto front. Otherwise, if the existing optimal path and the Pareto front are not close enough (e.g., larger than 5% deviation), the computing device may perform other actions. In one example, the computing device may add a virtual line, preferably straight line, between the points of the nearest match on the data of the existing optimal path and the approximate Pareto front, and use the data (in particular know n weights determined by experts) of that point on the existing optimal path as data for the point on the Pareto front. In another example, the computing device may add a virtual line, preferably straight line, between the origin and its nearest point of the Pareto front. The intersection point that the added line cuts the data (in particular known weights determined by experts) of the existing optimal path is used as data for the point on the Pareto front. In this way, the determination of the risk index can be more efficient and reliable.

Exemplary System

Referring to FIG. 21, there is shown a schematic diagram of an exemplary information handling system 2100 that can be used as a server or other information processing systems in one embodiment for performing the method in the embodiments in this example. Preferably, the server 2100 may have different configurations, and it generally comprises suitable components necessary to receive, store and execute appropriate computer instructions or codes. The main components of the server 2100 area processing unit 2102 and a memory unit 2104. The processing unit 2102 is a processor such as a CPU, an MCU, etc. The memory unit 2104 may include a volatile memory unit (such as RAM), a non-volatile unit (such as ROM, EPROM, EEPROM and flash memory) or both. Preferably, the server 2100 further includes one or more input devices 2106 such as a keyboard, a mouse, a stylus, a microphone, a tactile input device (e.g., touch sensitive screen) and a video input device (e.g., camera). The server 2100 may further include one or more output devices 2108 such as one or more displays, speakers, disk drives, and printers. The displays may be a liquid crystal display, a light emitting display or any other suitable display that may or may not be touch sensitive. The server 2100 may further include one or more disk drives 2112 which may encompass solid state drives, hard disk drives, optical drives and/or magnetic tape drives. A suitable operating system may be installed in the server 2100, e.g., on the disk drive 2112 or in the memory unit 2104 of the server 2100. The memory unit 2104 and the disk drive 2112 may be operated by the processing unit 2102. The server 2100 also preferably includes a communication module 2110 for establishing one or more communication links (not shown) with one or more other computing devices such as a server, personal computers, terminals, wireless or handheld computing devices. The communication module 2110 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 2102, the memory unit 2104, and optionally the input devices 2106, the output devices 2108, the communication module 2110 and the disk drives 2112 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 2100 shown in FIG. 21 is merely exemplary and that different information handling systems or servers 2100 may have different configurations and still be applicable in the present example.

The system for storing and processing the weighting information may also include one or more exemplary information handling systems 2100. Likewise, the computing system for disaster management may also include one or more exemplary information handling systems 2100.

Although not required, the embodiments described with reference to the FIG. 20 can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of this example are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to this example as shown in the specific embodiments without departing from the spirit or scope of this example as broadly described. For example, the method can be applied to determine optimal laying arrangement of any infrastructure link, including fluid pipeline (e.g., oil, water, and gas pipes), electric power cables, electric data cables, optical cables, etc. The present embodiments are to be considered in all respects as illustrative, not restrictive.

The invention claimed is:

1. A method for designing and constructing a sub-marine cable, comprising:
   determining, using one or more processors, a laying path of the sub-marine cable between two geographic locations, including:
      modeling a geographic terrain containing the two geographic locations, including modelling the geographic terrain into a grid with multiple grid points in which each point of the model is denoted by a 3D coordinate including altitude of the geographic terrain;
      optimizing, using the one or more processors, an arrangement cost and a repair rate for the laying path based on the modelled geographic terrain, an arrangement cost model, and a repair rate model;
      determining, using the one or more processors and based on the optimization, a set of Pareto optimal solutions for generating an approximate Pareto front; and
      determining, using the one or more processors, the laying path based on the approximate Pareto front;
   determining, using the one or more processors, whether a disaster that affects the determined laying path has occurred;
   in response to determining that a disaster has occurred, using the one or more processors to broadcast information related to the occurrence of the disaster;
   in response to the broadcasting of the information, receiving at the one or more processors, input of one or more weightings to be applied to one or more quantified cost factors and one or more quantified risk factors associated with the determined laying path;
   applying, using the one or more processors, the one or more weightings to the one or more quantified cost factors and one or more quantified risk factors to determine a weighted sum of the one or more quantified cost factors and the one or more risk factors;
   determining, using the one or more processors, a plurality of respective local risk indices, each respective local risk index of the plurality of respective local risk indices being associated with a respective portion of a plurality of portions of the determined laying path, the respective local risk index of at least two portions of the plurality of portions being determined based on different cost and risk factors, and a sum or integration of the plurality of respective local risk indices providing a risk index that represents a survivability of the sub-marine cable affected by the disaster; and
   constructing the sub-marine cable based on the determined laying path and the plurality of respective local risk indices, using one or more higher levels of cable protection and/or shielding to construct portions of the plurality of portions having higher local risk indices.

2. The method of claim 1, wherein the risk index further represents an expected number of failures of the sub-marine cable over a lifetime of the sub-marine cable.

3. The method of claim 1, wherein the risk index further represents an uncertainty associated with future costs associated with the sub-marine cable.

4. The method of claim 1, further comprising determining the risk index, using the one or more processors, by summing or integrating each respective local risk index of the plurality of respective local risk indices.

5. The method of claim 4, further comprising:
   displaying, at a display operably connected with the one or more processors, the determined laying path on a map of the modelled geographic terrain and the determined risk index associated with the determined laying path.

6. The method of claim 1, wherein the sub-marine cable is an optical cable.

7. The method of claim 1, wherein the arrangement cost model incorporates a direction-dependent factor and a direction-independent factor associated with the laying path;
   wherein the direction-dependent arrangement cost factor being associated with a capsize risk of a remotely operated vehicle arranged to lay the sub-marine cable; and
   wherein the optimizing considers at least one design level and comprises:
   calculating a minimum weighted cost value over the at least one design level for each point on the modelled geographic terrain;
   transforming the optimization to a Hamilton-Jacobi-Bellman equation based on the calculated minimum weighted cost value; and
   applying Ordered Upwind Method to solve the Hamilton-Jacobi-Bellman equation for determining the laying path;
   wherein the arrangement cost model models the direction-dependent arrangement cost factor as $$h_1(x,a) = e^{q1(x,a)-\theta_1} + e^{q2(x,a)-\theta_2},$$

wherein $h_1$ is the direction dependent arrangement cost, x is the 3D coordinate of the grid point, a is a direction of the path, e is an exponential function, $q_1(x, a)$ is a slope parallel to the direction of the path as a function of x and a, $q_2(x, a)$ is a slope perpendicular to the direction of the path as a function of x and a, $\theta_1$ is a threshold representing an allowable maximum slope parallel to the direction of the path, and $\theta^2$ is a threshold representing an allowable maximum slope perpendicular to the direction of the path.

8. A system for facilitating design and construction of a sub-marine cable, comprising:
   one or more processors arranged to:
   determine a laying path of the sub-marine cable between two geographic locations, by:
      modeling a geographic terrain containing the two geographic locations, including modelling the geographic terrain into a grid with multiple grid points in which each point of the model is denoted by a 3D coordinate including altitude of the geographic terrain;
      optimizing an arrangement cost and a repair rate for the laying path based on the modelled geographic terrain, an arrangement cost model, and a repair rate model;
      determining, based on the optimization, a set of Pareto optimal solutions for generating an approximate Pareto front; and
      determining, using the one or more processors, the laying path based on the approximate Pareto front;
   determine whether a disaster that affects the determined laying path has occurred;
   broadcast information related to the occurrence of the disaster in response to determining that a disaster has occurred;
   in response to the broadcasting of the information, receive input of one or more weightings to be applied to one or more quantified cost factors and one or more quantified risk factors associated with the determined laying path;
   apply the one or more weightings to the one or more quantified cost factors and the one or more quantified risk factors associated with the determined path laying path to determine a weighted sum of the one or more quantified cost factors and the one or more risk factors; and determine a plurality of respective local risk indices, each respective local risk index of the plurality of respective local risk indices being associated with a respective portion of a plurality of portions of the determined laying path, the respective local risk index of at least two portions of the plurality of portions being determined based on different cost and risk factors, and a sum or integration of the plurality of respective local risk indices providing a risk index that represents a survivability of the sub-marine cable affected by the disaster; and a cable laying vehicle arranged to facilitate construction of the sub-marine cable based on the determined laying path and the plurality of respective local risk indices, with one or more higher levels of cable protection and/or shielding used to construct portions of the plurality of portions having higher local risk indices.

9. The system of claim 8, wherein the risk index further represents an expected number of failures of the sub-marine cable over a lifetime of the sub-marine cable.

10. The system of claim 8, wherein the risk index further represents an uncertainty associated with future costs associated with the sub-marine cable.

11. The system of claim 8, further comprising an input device operably connected with the one or more processors, said input device arranged to receive input of the one or more weightings to be applied to one or more quantified cost factors and one or more quantified risk factors associated with the determined laying path.

12. The method of claim 1, wherein the optimizing considers at least two design levels and comprises:
calculating a minimum weighted cost value over the at least two design levels for each point on the modelled geographic terrain;
transforming the optimization to an Eikonal equation based on the calculated minimum weighted cost value; and
applying fast marching method to solve the Eikonal equation for determining the laying path.

13. The system of claim 8, wherein the one or more processors are further arranged to determine the risk index by summing or integrating the plurality of respective local risk indices.

14. The system of claim 8, wherein the sub-marine cable is an optical cable.

15. The system of claim 8, wherein the optimization considers at least two design levels, and wherein the one or more processors are arranged to perform the optimization by:
calculating a minimum weighted cost value over the at least two design levels for each point on the modelled geographic terrain;
transforming the optimization to an Eikonal equation based on the calculated minimum weighted cost value; and
applying fast marching method to solve the Eikonal equation for determining the laying path.

16. The system of claim 8, wherein the arrangement cost model incorporates a direction-dependent factor and a direction-independent factor associated with the laying path, and wherein the one or more processors are arranged to perform the optimization by;
wherein the direction-dependent arrangement cost factors being associated with a capsize risk of a remotely operated vehicle arranged to lay the sub-marine cable; and
wherein the optimizing considers at least one design level and the one or more processors are arranged to perform the optimization by:
applying Ordered Upwind Method to solve the Hamilton-Jacobi-Bellman equation for determining the laying path
wherein the arrangement cost model models the direction-dependent arrangement cost factor as $$h_1(x,a)=e^{q_1(x,a)-\theta_1}+e^{q_2(x,a)-\theta_2},$$

wherein $h_1$ is the direction dependent arrangement cost, x is the 3D coordinate of the grid point, a is a direction of the path, e is an exponential function, $q_1(x, a)$ is a slope parallel to the direction of the path as a function of x and a, $q_2(x, a)$ is a slope perpendicular to the direction of the path as a function of x and a, $\theta_1$ is a threshold representing an allowable maximum slope parallel to the direction of the path, and $\theta_2$ is a threshold representing an allowable maximum slope perpendicular to the direction of the path.

17. The system of claim 8, wherein the one or more processors are further arranged to determine the risk index by summing or integrating the plurality of respective local risk indices; and wherein the system further comprises a display, operably connected with the one or more processors, for displaying the determined laying path on a map of the modelled geographic terrain and the determined risk index associated with the determined laying path.

* * * * *

UNITED STATES PATENT AND TRADEMARK OFFICE
CERTIFICATE OF CORRECTION

PATENT NO. : 11,637,417 B2
APPLICATION NO. : 16/123471
DATED : April 25, 2023
INVENTOR(S) : Moshe Zukerman et al.

It is certified that error appears in the above-identified patent and that said Letters Patent is hereby corrected as shown below:

In the Claims

Claim 7, at Column 32, Line 35 is amended to read as follows:
"path, and $\theta_2$ is a threshold representing an allowable maxi-"

Claim 8, at Column 33, Line 1-2 is amended to read as follows:
"risk factors associated with the determined laying"

Signed and Sealed this
Twenty-eighth Day of November, 2023

Katherine Kelly Vidal
*Director of the United States Patent and Trademark Office*